US009407975B2

(12) United States Patent
Grusd

(10) Patent No.: US 9,407,975 B2
(45) Date of Patent: Aug. 2, 2016

(54) SYSTEMS AND METHODS FOR PROVIDING USER INTERACTIONS WITH MEDIA

(71) Applicant: Brandon Grusd, La Jolla, CA (US)

(72) Inventor: Brandon Grusd, La Jolla, CA (US)

(*) Notice: Subject to any disclaimer, the term of this patent is extended or adjusted under 35 U.S.C. 154(b) by 0 days.

(21) Appl. No.: 14/198,519

(22) Filed: Mar. 5, 2014

(65) Prior Publication Data

US 2014/0259056 A1    Sep. 11, 2014

Related U.S. Application Data

(60) Provisional application No. 61/772,989, filed on Mar. 5, 2013.

(51) Int. Cl.
| H04N 5/445 | (2011.01) |
| H04N 21/858 | (2011.01) |
| H04N 21/2668 | (2011.01) |
| H04N 21/4725 | (2011.01) |
| H04N 21/81 | (2011.01) |
| G06Q 30/02 | (2012.01) |

(52) U.S. Cl.
CPC ....... *H04N 21/8583* (2013.01); *G06Q 30/0241* (2013.01); *H04N 21/2668* (2013.01); *H04N 21/4725* (2013.01); *H04N 21/812* (2013.01)

(58) Field of Classification Search
CPC .......... H04N 21/234318; H04N 21/59; H04N 21/23412; H04N 21/4725
See application file for complete search history.

(56) References Cited

U.S. PATENT DOCUMENTS

| 7,577,978 | B1* | 8/2009 | Wistendahl et al. | 725/113 |
| 7,890,380 | B2* | 2/2011 | Stefanik et al. | 705/26.1 |
| 8,046,388 | B2* | 10/2011 | Yanagita et al. | 707/804 |
| 8,296,185 | B2* | 10/2012 | Isaac | 705/14.55 |
| 8,365,213 | B1* | 1/2013 | Orlowski | 725/13 |
| 2002/0049983 | A1* | 4/2002 | Bove et al. | 725/135 |
| 2002/0078446 | A1* | 6/2002 | Dakss et al. | 725/37 |
| 2003/0110507 | A1* | 6/2003 | Dimitrova et al. | 725/110 |
| 2005/0172312 | A1* | 8/2005 | Lienhart et al. | 725/19 |
| 2006/0195860 | A1* | 8/2006 | Eldering et al. | 725/19 |
| 2007/0279521 | A1* | 12/2007 | Cohen | 348/376 |
| 2008/0034295 | A1* | 2/2008 | Kulas | 715/723 |
| 2008/0046956 | A1* | 2/2008 | Kulas | 725/136 |

(Continued)

OTHER PUBLICATIONS

PCT "International Search Report and Written Opinion of the International Search Authority for PCT/US2014/20918", mailed Aug. 4, 2014.

(Continued)

*Primary Examiner* — Pankaj Kumar
*Assistant Examiner* — Timothy Newlin
(74) *Attorney, Agent, or Firm* — Dergosits & Noah LLP

(57) ABSTRACT

Objects in a video are identified, and linked to ecommerce sites and advertisements. A user may select an object and be provided with information about the object. A video stream may be encoded with a separate metadata stream that contains the identity of each object on each frame of the video. The metadata channel may be extracted from a video stream and displayed to a user when the user clicks on the corresponding object. A device may take a video input, analyze it, and recognize the video. The device may look up said video in a database of tagged videos, output as an overlay or separate window to a video display device stream with information about the item. A user interface device may allow a user to select objects on a video screen and select and choose said object for integration with the other components of the system.

18 Claims, 18 Drawing Sheets

(56) References Cited

U.S. PATENT DOCUMENTS

| | | | |
|---|---|---|---|
| 2008/0052750 A1* | 2/2008 | Grunnet-Jepsen et al. | 725/109 |
| 2008/0098432 A1* | 4/2008 | Hardacker et al. | 725/51 |
| 2008/0109851 A1* | 5/2008 | Heather et al. | 725/60 |
| 2008/0184132 A1* | 7/2008 | Zato | 715/748 |
| 2009/0006937 A1* | 1/2009 | Knapp et al. | 715/205 |
| 2009/0113475 A1* | 4/2009 | Li | 725/39 |
| 2009/0123025 A1* | 5/2009 | Deng et al. | 382/100 |
| 2010/0005488 A1* | 1/2010 | Rakib et al. | 725/34 |
| 2010/0154007 A1* | 6/2010 | Touboul et al. | 725/60 |
| 2010/0172635 A1* | 7/2010 | Harris | 386/124 |
| 2011/0082735 A1* | 4/2011 | Kannan et al. | 705/14.23 |
| 2011/0113444 A1* | 5/2011 | Popovich | 725/32 |
| 2011/0162002 A1* | 6/2011 | Jones et al. | 725/32 |
| 2013/0024293 A1* | 1/2013 | Tinsman et al. | 705/14.68 |
| 2013/0174191 A1* | 7/2013 | Thompson et al. | 725/23 |
| 2013/0326573 A1* | 12/2013 | Sharon et al. | 725/115 |
| 2014/0282735 A1* | 9/2014 | Davis et al. | 725/48 |

OTHER PUBLICATIONS

PCT Notification Concerning Transmittal of International Preliminary Report on Patentability and Written Opinion, date mailed Sep. 17, 2015, received Oct. 6, 2015.

* cited by examiner

SYSTEMS AND METHODS FOR PROVIDING USER INTERACTIONS WITH MEDIA

CROSS-REFERENCE TO RELATED APPLICATIONS

This patent application claims priority to U.S. provisional patent application 61/772,989, filed Mar. 5, 2013, which is incorporated by reference along with all other references cited in this application.

BACKGROUND OF THE INVENTION

Traditional viewing of video is burdened by its inherently passive experience. Regardless of the device (TV, Movie Screen, Mobile Device, Computer, Tablet computer, etc.) one uses to watch video, viewers of that video are unable to directly interact with the visual objects in that video (where objects in the video refer to, but are not limited to, the people, clothing, landscape, buildings, cars, electronic or other devices, food or drink items, furniture, actors, faces, jewelry, hair, etc.) as those objects appear in one or more frames of any given video.

Currently, there is no system or method that identifies, encodes, and tracks visual objects in video and allow viewers to interact with those objects, whether by clicking, touching, pointing, waving or a similar interaction method, hereinafter referred to as "clicking") in order to: (i) discover the identity and related metadata of said object, (ii) be provided with an opportunity to purchase that object, (iii) be served an advertisement directly based on the identity of said object, and/or be offered (iv) a richer content experience based on the identity of said object.

SUMMARY OF THE INVENTION

Various systems and methods are disclosed in which one or more objects in a video stream may be identified throughout the video stream and linked to any of (a) ecommerce sites, links or experiences for immediate purchase, (b) advertisements based on the identity and nature of said object(s), and/or (c) richer content experiences based on the identity and/or nature of said object(s). A user may click on an object in a video, have that object be identified, and/or be provided with a link or set of information about the object. The user may be able to immediately purchase that object online. An advertisement or additional content experience may be displayed to a user based on the object.

A video stream may be encoded with a separate metadata stream that contains the identity of each object on each frame of the video. The metadata relating to any object within the video stream may be extracted from the video stream and displayed to a user when the user clicks on the corresponding object.

Disclosed are systems and methods for tagging objects in video, identifying objects manually, semi-autonomously, and autonomously using various computer vision and machine learning algorithms, identifying and/or tracking those objects in video, and linking those objects to, any of (a) destinations or other opportunities to purchase those or related objects, (b) advertisements based on the nature of said object. In some implementations, tagging includes drawing a region of interest (ROI) around an object of interest, automatically tracking said object across the video using one or more computer vision algorithms when tracking gets lost then searching the frame for the object and comparing search results to a database of objects to re-identify the object and continue to track it. Object recognition may include comparing an ROI to a database of predetermined and identified items, as well as negative examples. Objects that are deemed by a computer vision algorithm to be the same or similar enough to an object in the database will be labeled as such object. A user will be able to edit incorrectly labeled objects, and the database will be updated. In various implementations, various frame segmentation algorithms are used, where each frame will be segmented autonomously. Each object segmented within the frame will be automatically compared to a database of pre-identified objects. The same or similar objects will be labeled as such object. A user will be able to edit incorrectly labeled objects, and the database will be updated.

In some implementations, a method is disclosed, the method comprising allowing a user to click on an object in a video, have that object be identified and provide the user with a link or set of information about said tagged object. Identification may involve searching a particular video and frame of a previously tagged video and recalling the previously identified reference to an objects database. Identification may also involve automatically segmenting a frame, and determining the outline of the object of interest, then comparing said object to a database of all objects.

In various implementations, a method is disclosed, the method comprising allowing a user to click on an object in a video, have that object be identified and provide the user with the ability to immediately purchase that object online. Identification may involve searching a particular video and frame of a previously tagged video and recalling a previously identified reference to an objects database. Identification may also involve automatically segmenting a frame, and determining the outline of the object of interest, then comparing said object to a database of all objects.

According to some implementations, a method is disclosed, the method comprising allowing a user to click on an object in a video, and have an advertisement based on said object be displayed for that user. Identification may involve searching a particular video and frame of a previously tagged video and recalling the previously identified reference to an objects database. Identification may also involve automatically segmenting a frame, and determining the outline of the object of interest, then comparing said object to a database of all objects. Various factors analyzed may include: how much of the screen does the tagged object take up; how many frames does the particular object appear in; a location of a tagged object on screen (foreground weighted more than background, center objects are weighted more); a real life cost of the object; what objects are clicked upon (more clicks equals more popular and more ads based on those objects); an auction model where people pay for objects; a color of an object; a theme of a video/scene (drama, comedy, reality, home improvement, sports, cooking, news, horror, romance, etc.); demographics of a person watching a video, as well as demographics of video as a whole; a particular device a video is being displayed upon; prior purchase and click history of particular user and users as a whole; a popularity of a particular object based on total sales (number of units and dollar amount); and an identity and popularity of a person (actor or actress) in a video associated with an object.

In some implementations, a method is disclosed, the method comprising encoding a pre-existing video stream with a separate metadata stream that contains the identity of each object on each frame of the video.

In various implementations, a method is disclosed, the method comprising extracting a metadata channel from a video stream and displaying said data to a user when the user clicks on the corresponding object or otherwise.

According to some implementations, an apparatus is disclosed, the apparatus comprising a device or devices that take a video input, analyze said input, and recognize the video (name of video, name of episode, etc.). The device or devices may look up said video in a database of tagged videos, and output as an overlay or separate window to a video display device stream with information about the item (name, brand, internet or brick & mortar locations to purchase, list of similar products or other recommended products, advertisements, color, web search information, Wikipedia entry, sport statistics etc.).

In various implementations, an apparatus is disclosed, the apparatus comprising a user interface device that allows a user to point to and select an object on a video screen and select and choose said object for integration with the previously described device or devices.

In some implementations, a method is disclosed, the method comprising displaying an advertisement based on the types of objects present within the video. The displaying may be based on one or more of the following: how much of the screen does the tagged object take up; how many frames does the particular object appear in; a location of a tagged object on screen (foreground weighted more than background, center objects are weighted more); a real life cost of the object; what objects are clicked upon (more clicks equals more popular and more ads based on those objects); an auction model where people pay for objects; a color of an object; a theme of a video/scene (drama, comedy, reality, home improvement, sports, cooking, news, horror, romance, etc.); demographics of a person watching video, as well as demographics of video as a whole; a particular device a video is being displayed upon; prior purchase and click history of particular user and users as a whole; a popularity of particular object based on total sales (number of units and dollar amount); and an identity and popularity of a person (actor or actress) in a video associated with an object.

In particular implementations, a method is disclosed, the method comprising providing scene sentiment detection and categorization.

DETAILED DESCRIPTION OF THE INVENTION

Figure 1:
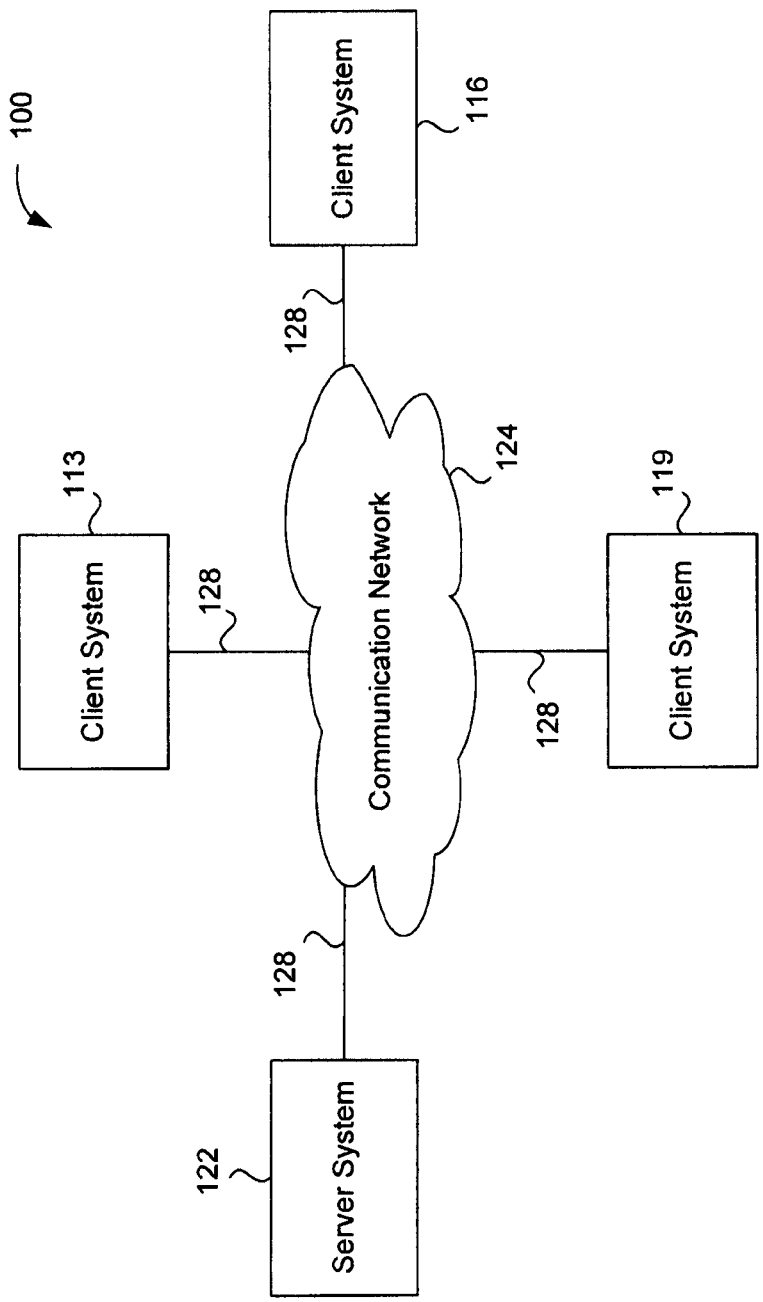
FIG. 1 shows a block diagram of a client-server system and network, according to some implementations.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, the Firefox browser provided by Mozilla Foundation, the Chrome browser provided by Google, the Safari browser provided by Apple, and others.

Figure 2:
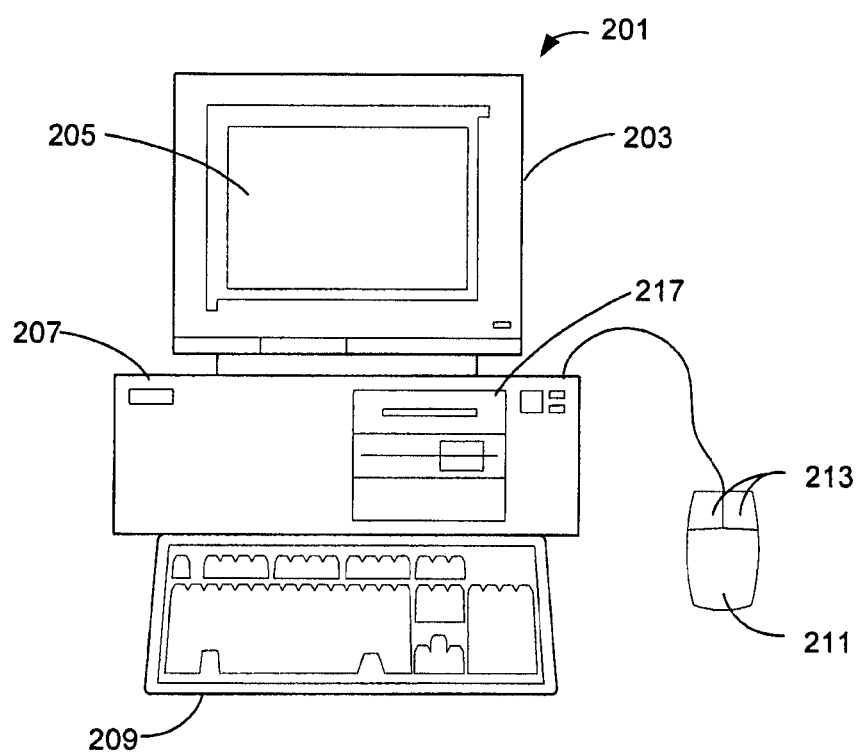
FIG. 2 shows a more detailed diagram of an exemplary client or computer, according to some implementations.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

While FIG. 2 depicts a computer system 201 that includes a monitor 203, screen 205, cabinet 207, keyboard 209, and mouse 211, it will be appreciated that various implementations may utilize a mobile device, such as a Smartphone, a tablet PC, or any other device capable of mobile computing.

Figure 3:
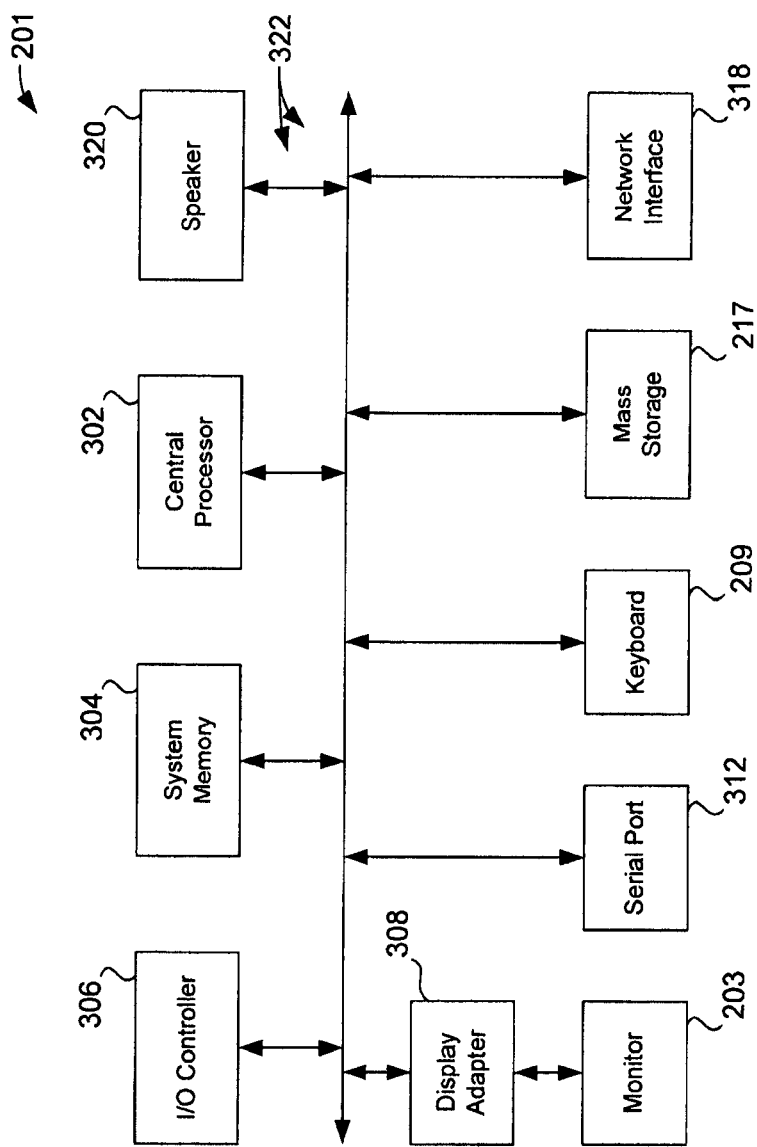
FIG. 3 shows a system block diagram of a client computer system, according to some implementations.

FIG. 3 shows a system block diagram of computer system 201. As in FIG. 2, computer system 201 may include a monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, IRIX64, iOS provided by Apple, Android provided by Google. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

With reference to FIGS. 4-18, according to some implementations, an integrated system is provided that may, among other things, enable the tagging of videos. For example, visual objects in a video may be automatically tagged using computer vision and machine learning algorithms. In some implementations, each tagged item is linked to an online ecommerce site, brick and mortar store, comparative shopping site, or search result from a search engine. Each tagged item may also be linked to an advertisement based on the particular identification of the item being tagged. The tagging process may include taking a video and dividing each video into shots (where a shot is a series of interrelated consecutive pictures taken contiguously by a single camera and representing a continuous action in time and space). The series of shots may be rearranged such that similar shots are combined to form a supershot. Each face from the video may be automatically extracted, and similar faces may be sorted and binned together for identification by machine learning algorithms with human supervision. Accordingly, each face within a video may be labeled with the actor's real name and character name.

Figure 4:
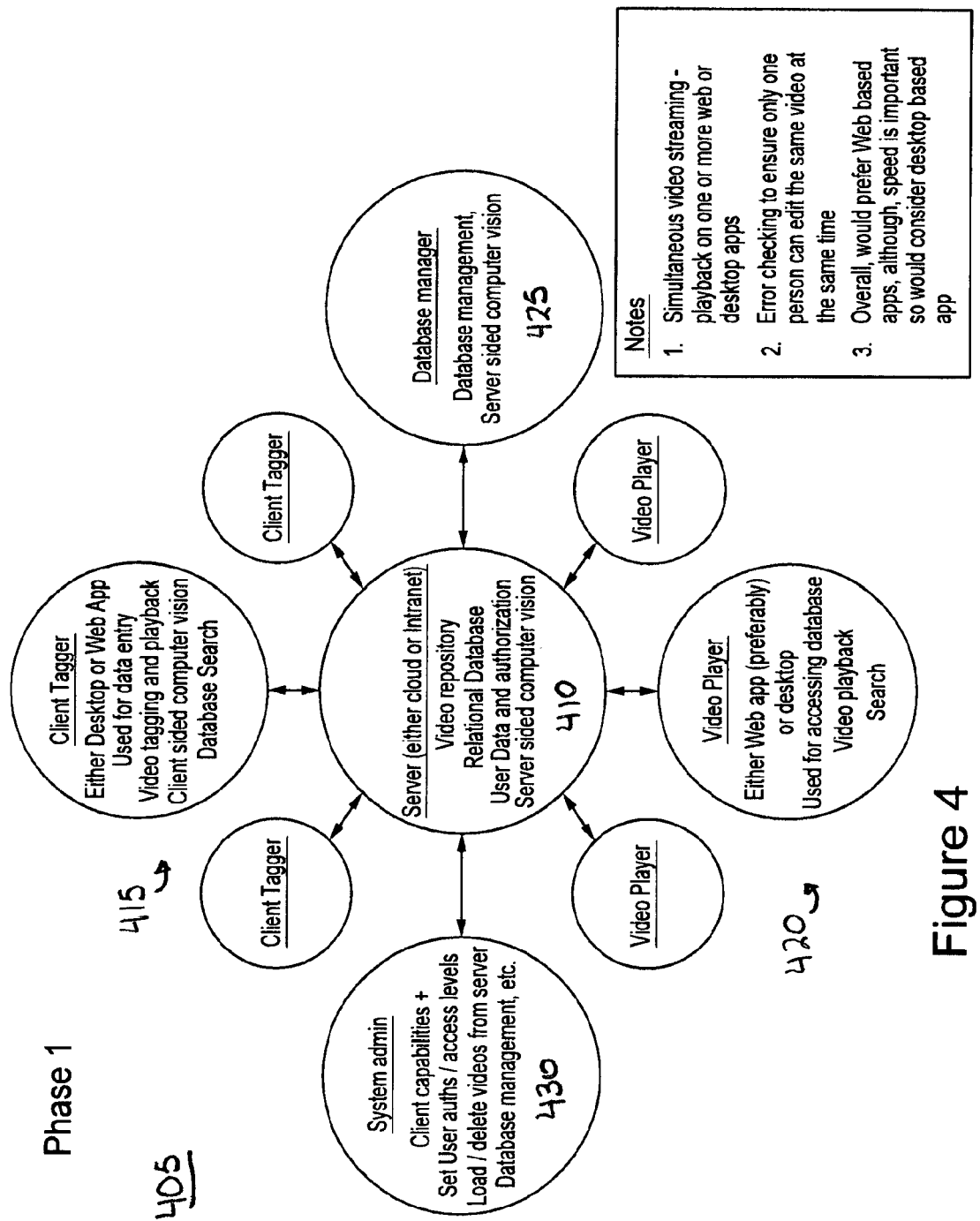
FIG. 4 shows an example of a diagram of one or more components of a system, according to some implementations.

FIG. 4 shows a simplified block diagram of some components of system 405. The system supports simultaneous video streaming and playback on web or desktop applications. Error checking is provided to help ensure that only one person can edit the same video at the same time. This system includes a server system 410, client taggers 415, video players 420, a database manager 425, and a system administration module 430.

The server system includes storage for a video repository and user data. The data can be stored in a relational database. The server system is responsible for user data and authorization and server-sided computer vision processing.

The client tagger can be a desktop or web application. The tagger is used for data entry including video tagging and playback. The tagger provides an interface for database searches and is responsible for client-sided computer vision processing.

The video player can be a web application or desktop. The player is responsible for video playback. The player includes an interface for searching. The database can be accessed through the player. The database manager is responsible for database management and facilitates the server-sided computer vision processing.

The system administration module is responsible for setting the client capabilities including, for example, setting user authorization and access levels, loading and deleting videos from the server, database management, and other administration tasks.

In various implementations, tagging includes drawing an ROI around an object of interest, and automatically tracking said object across the supershot using computer vision algorithms with or without human supervision. Each object may be labeled and various data may be stored, including but not limited to, the SKU number, color or colors, name of the item, brand of the item, location within the frame, the time stamp or frame number within the video when the object is visible, the name, genre, date of publication, and type of video in which the object appears). According to some implementations, if the tracking gets lost, the tagging system may search each pixel or series of pixels of each frame of the video or supershot for the item. Each of the pixels or series of pixels will be compared to a database of objects in order to re-identify the object being tracked and thereby continue to track it. In some implementations, object recognition may include comparing an ROI to a database of predetermined and identified items, as well as negative examples. Objects that are deemed by computer vision algorithms to be the same or similar enough to an object in the database may be labeled as such object. A user may be able to edit incorrectly labeled objects, and the database may be updated.

In various implementations, this process may be repeated until all items within a video are labeled, identified, and linked. Once a sufficiently robust and large database of objects is created, the process can be run autonomously without human interaction.

Figure 5:
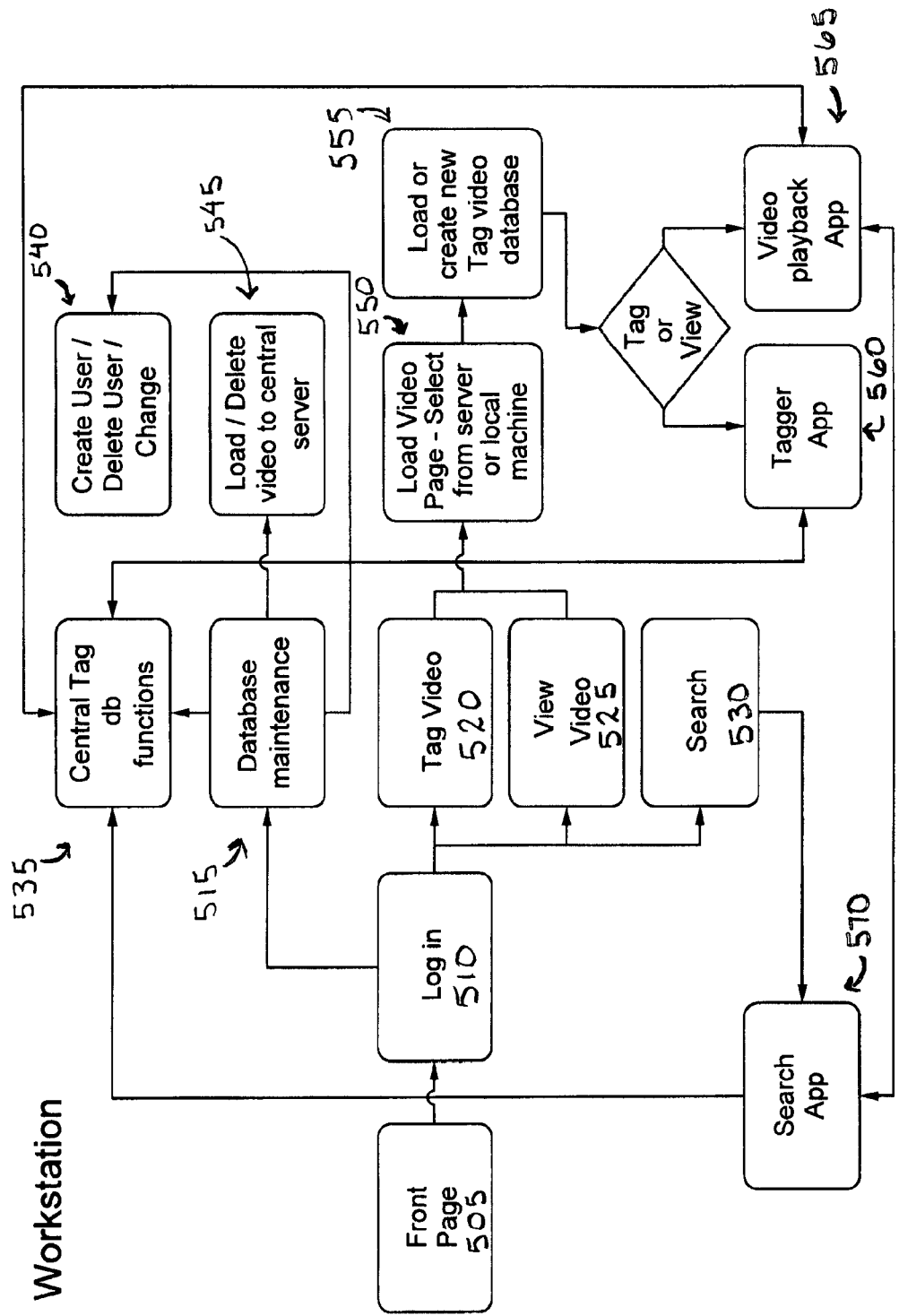
FIG. 5 shows an example of a block diagram of one or more processes, according to some implementations.

FIG. 5 shows a block diagram of some tagging components. In a specific embodiment, from a front page 505 of the system, a user can log in 510. After logging in, the system presents the user with options for accessing modules including database maintenance 515, video tagging 520, video viewing 525, or video searching 530. The database maintenance module includes a central tag database 535, a module 540 for creating a user, deleting a user, and a module 545 for loading a video to the central server or deleting a video from the central server.

The video tagging and view modules provide functions for loading a video 550 and loading or creating a new tag video database 555. Selecting the tagging option launches a tagger app 560. Selecting the viewing option launches a video playback app 565. Selecting the search option launches a search app 570.

Figure 6:
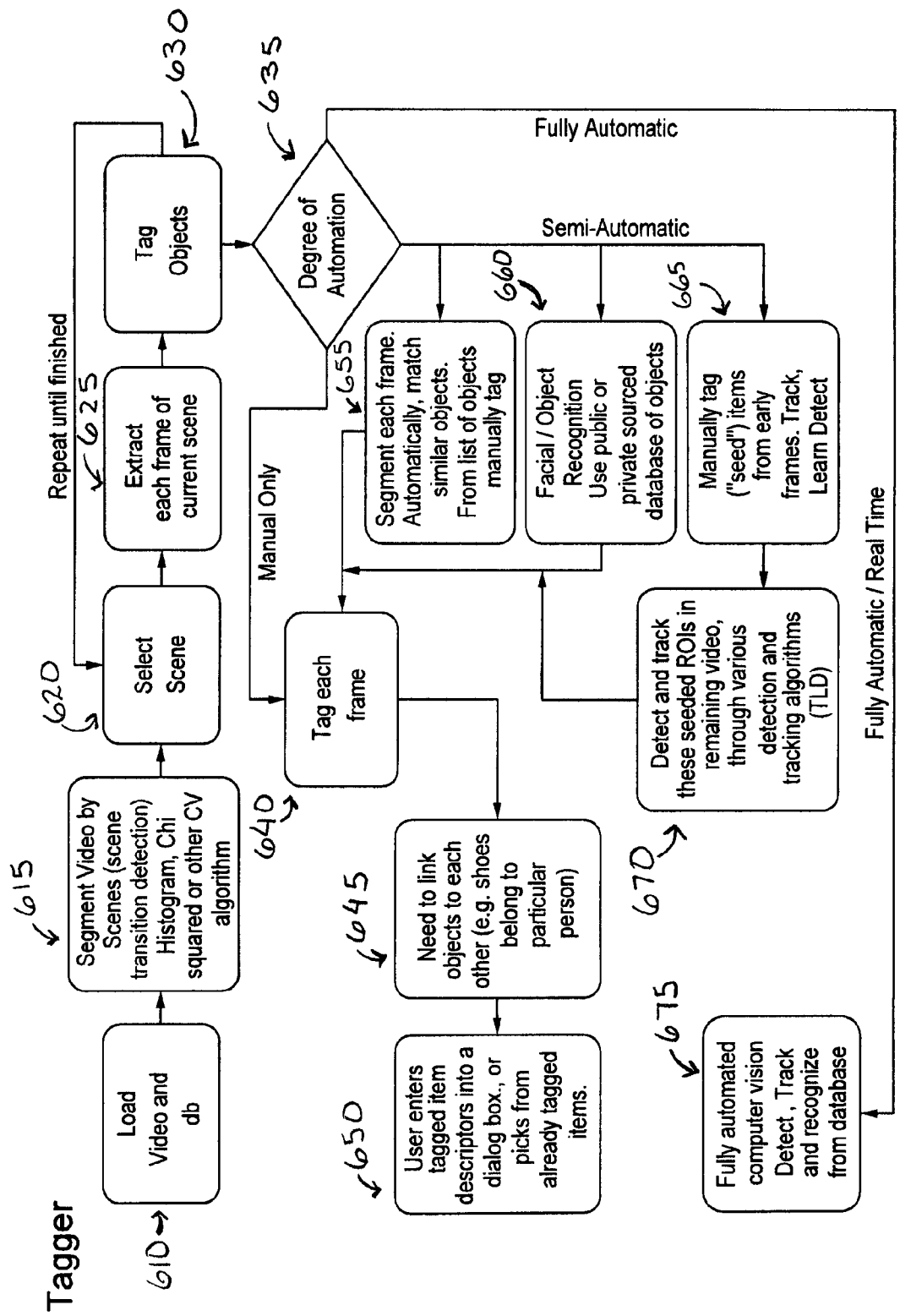
FIG. 6 shows another example of a block diagram of one or more processes, according to some implementations.

FIG. 6 shows a flow diagram for tagging. In a specific implementation, a step 610 includes loading a video and database. A step 615 includes segmenting a video scene by scene. The segmentation can include techniques involving scene transition detection, histograms, Chi squared, or other computer vision techniques. A step 620 includes selecting a scene. A step 625 includes extracting each frame of a current scene. A step 630 includes tagging objects in a frame.

Various implementations of the tagging process involve varying degrees of automation 635. In a specific implementation, tagging each frame 640 is a manual process. The tagging includes linking objects to each other (e.g., associating shoes as belonging to a particular person) 645. In a step 650, a user enters tagged item descriptors into a dialog box. Alternatively, the user can pick from already tagged items.

In another specific implementation, tagging is a semi-automatic process. In this specific implementation, the tagging includes a step 655 for segmenting each frame. The system automatically matches similar objects from a list of objects manually tagged. In a step 660, the system includes facial and object recognition. The recognition can rely on a publically sourced database of objects, a privately sourced database of objects, or both. A step 665 includes manually tagging ("seeding") items from early frames and tracking, learning, and detecting. A step 670 includes detecting and tracking these seeded ROIs in the remaining videos through various detection and tracking algorithms.

In another specific implementation, tagging is fully automatic 675. In this specific implementation, the system provides for fully automated computer vision for detecting, tracking, and recognizing from a database.

Once a video has been tagged, a user may be able to click, point, touch or otherwise connect to the object with any user interface options, and have the various data and URL links displayed. Thus the user may instantly purchase the item, save item to be purchased later, or share the item. The user may also have each click be stored in a personal database for that user such that the user can later on search, list, share or otherwise display the items upon which he or she clicked. The user may also search the database of tagged objects.

For those video display devices that do not have a built in ability to click, touch, point, or otherwise select an object on the screen, a separate user interface device may be provided. In various implementations, the device: takes the video stream from a cable, satellite or other video provider, as an input; compares the video stream to the database of tagged objects to identify the video; connects to a wireless pointing device that enables a user to point at a video screen and select an object being displayed; and as an output displays the appropriate URL links, advertisements, and other data relevant to the item selected. Thus, the device allows the user to instantly purchase the item, save the item to be purchased later, share the object with a friend over various social networking sites, email, text messaging, etc., and store the selection for later display, search, listing, or sharing.

Additionally, each object tagged within the video may have a corresponding advertisement that will be displayed either as an overlay on the video or along the gutter of the screen. Each advertisement may be linked to the website or other URL directed by the advertiser.

Figure 7:
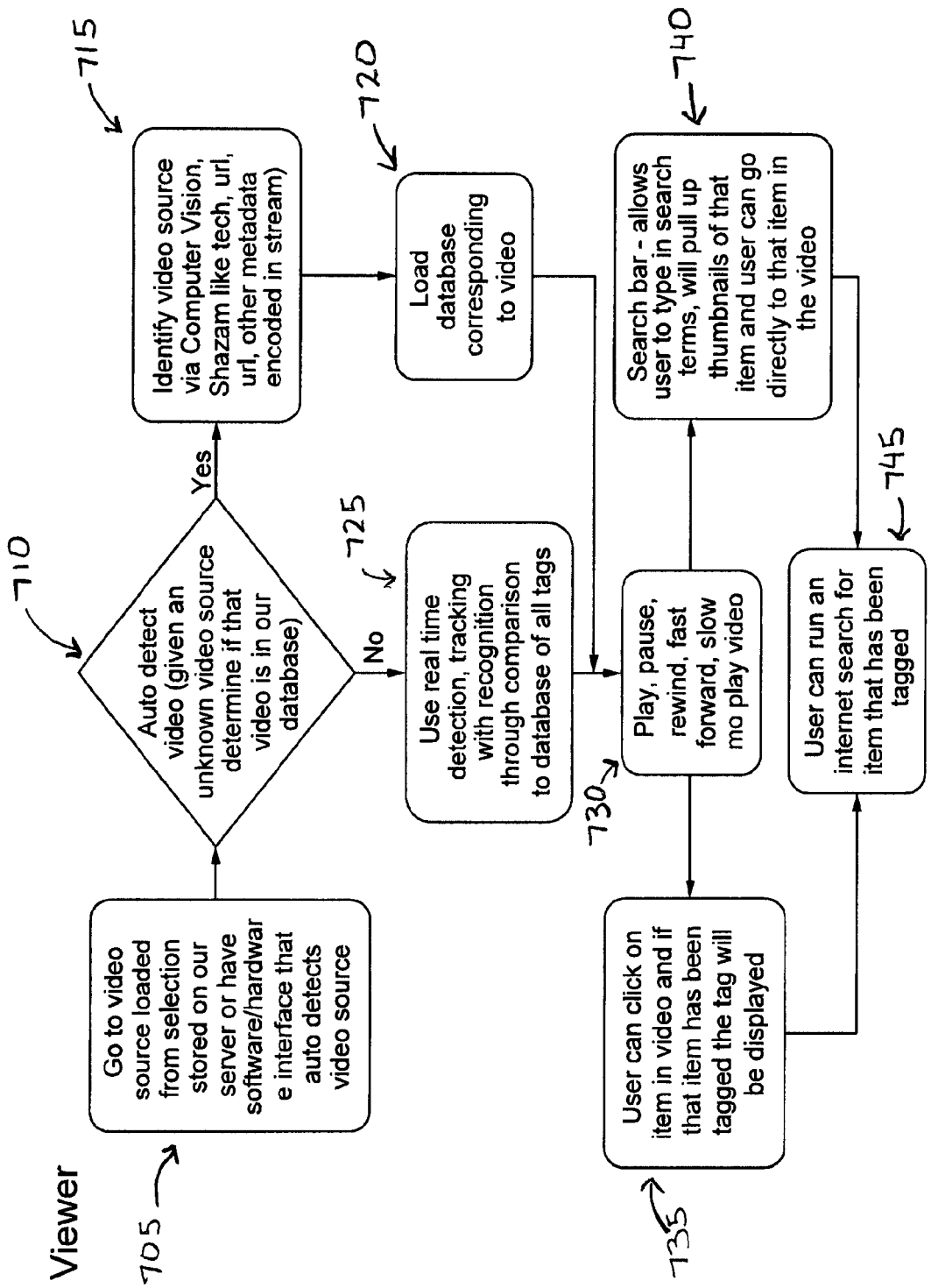
FIG. 7 shows another example of a block diagram of one or more processes, according to some implementations.

FIG. 7 shows a flow diagram for a viewer of the system. A step 705 includes accessing a video source. In a specific implementation, a video can be loaded from a repository of the system. In another specific implementation, there is a software/hardware interface that automatically detects a video source. In a step 710, autodetection includes given an unknown video source, determining if the video is in a database of the system. If so, a step 715 includes identifying a video source via, for example, computer vision, Shazam, a URL, or other metadata encoded in a stream. A step 720 includes loading from a database corresponding to the video. If not, a step 725 includes real-time detection and tracking with recognition through a comparison to the database of all tags.

The viewer includes controls 730 for play, pause, rewind, fast forward, and slow motion playing of the video. A user can click 735 on an item in a video. If that item has been tagged, the tag will be displayed. Alternatively, the viewer may include a search bar 740 that allows the user to type in search terms. The search tool may return a set of thumbnails associated with the item and the user can access the item directly. The user can then run 745 an Internet search for the item that has been tagged.

Figure 8:
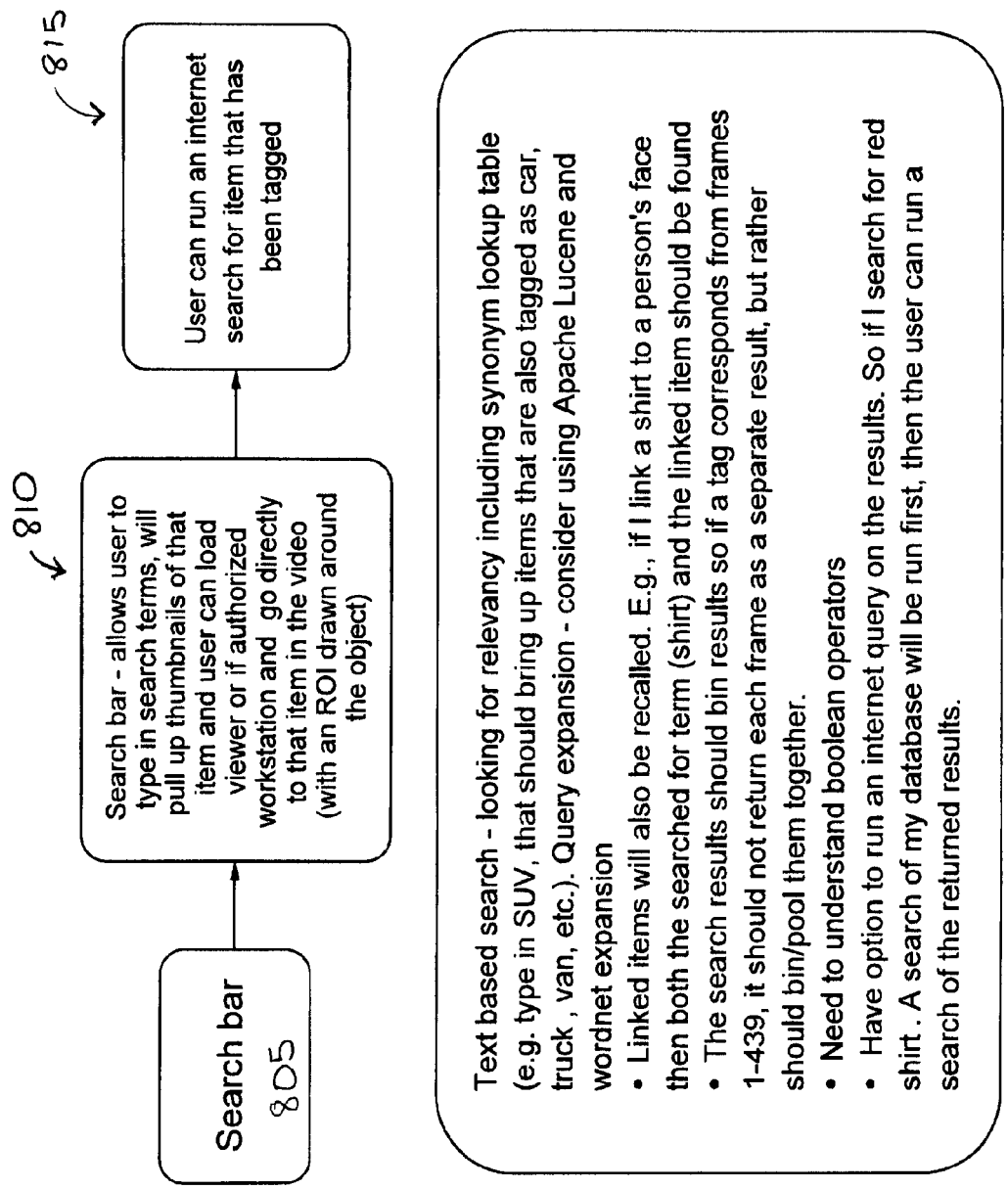
FIG. 8 shows another example of a diagram of one or more components of a system, according to some implementations.

FIG. 8 shows a more detailed flow of search bar searching 805. The search bar allows the user to type in search terms. A search result may include thumbnails of that item. The user can load a viewer or if the user is on an authorized workstation, go directly to that item in the video where there will be an ROI drawn around the object (step 810). In a step 815, the user can run an Internet search for the item that has been tagged.

There can be a text based search. A text based search includes looking or analyzing for relevancy. There can be a synonym lookup table. For example, inputting "SUV" may return items that are tagged as "car," "truck," "van," and so forth. There can be query expansion using Apache Lucene and wordnet expansion.

In a specific implementation, linked items will also be recalled. For example, if there is a link of a shirt to a person's face the both the searched for term (e.g., search) and linked item may be found.

In a specific implementation, search results include bin results. For example, if a tag corresponds from frames 1-439, the system may not return each frame as a separate result, but may bin or pool them together. There can be logic for understanding Boolean operators. There can be an option to run an internet query on the results. Consider, as an example, a search for red shirt. A search of the system database may be run first. The user can then run a search of the returned results.

Figure 9:
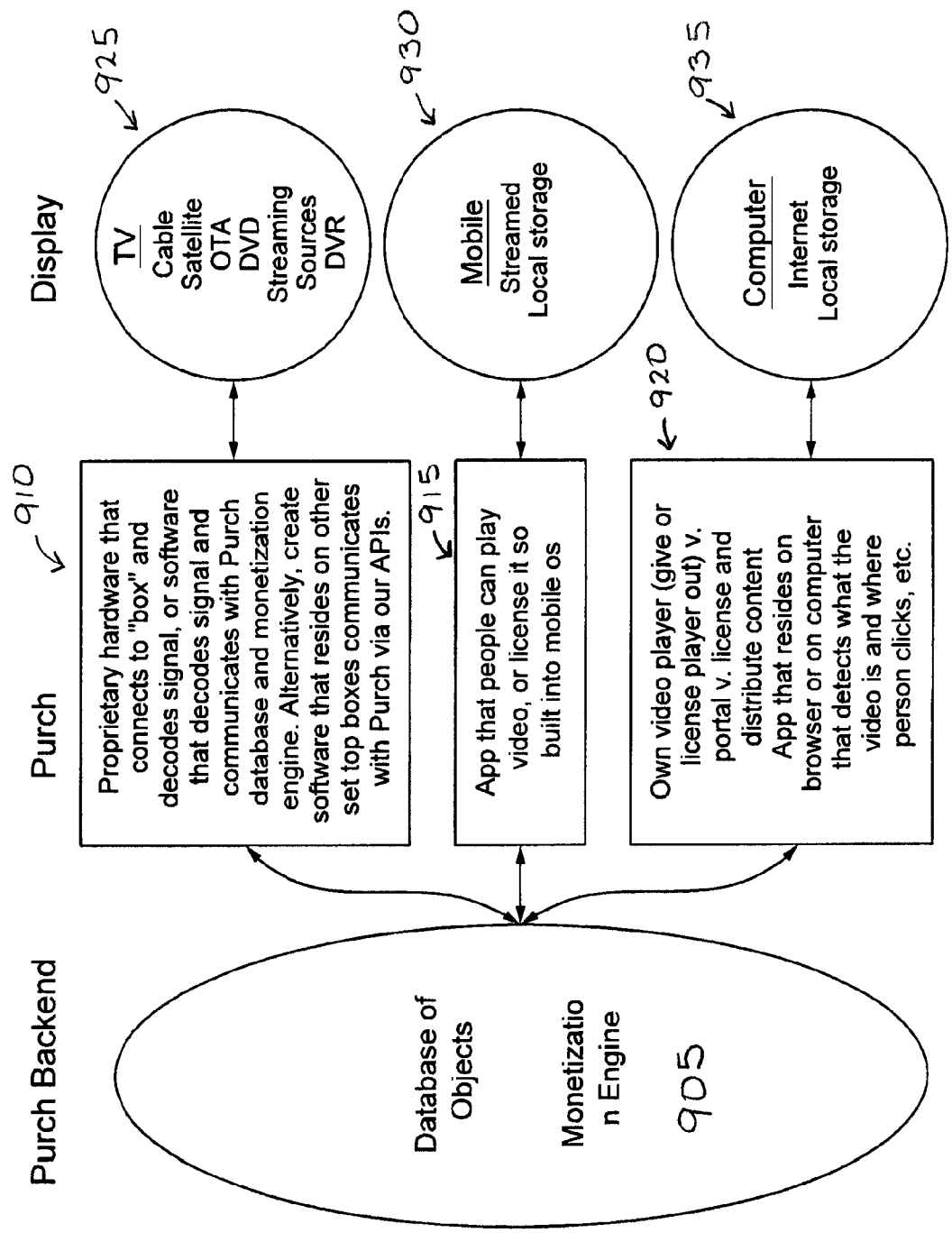
FIG. 9 shows another example of a diagram of one or more components of a system, according to some implementations.

FIG. 9 shows a block diagram of an overall architecture of the system. In a specific embodiment, the system includes a database of objects and a monetization engine 905 which may be connected to proprietary hardware 910, an application 915, or a video player 920. Proprietary hardware may include hardware that connects to a "box" and that decodes a signal, or software that decodes a single and communicates with the system database and monetization engine. Alternatively, there can be software that resides on set top boxes and communicates with the system through APIs. The proprietary hardware may be connected to a TV display device 925.

Application 915 includes an app so that people can play video. There can be a license in which the app is built into a mobile operating system. The application may be connected to a mobile display device 930. The video player may be provided without charge or licensed. There can be a portal. Content may be distributed from the system. There can be an application that resides on the browser or computer that detects the video and tracks user activity such as where the person clicks. The application may be connected to a computer display device 935.

Moreover, with regards to FIGS. 4-9, in various implementations, a database of username and access levels may be included. The database of username and access levels may store information identifying one or more of: a username; a password; an email address; an access level; a system admin; and a tagger.

According to various implementations, various determinations are made regarding front-end viewers. For example, ROIs clicked on by users may be determined. Search terms used by users may be determined. Market intelligence may be applied based on these determinations.

In some implementations, auto-tagging is run using detection algorithms that may make comparisons with a database of all tags. The algorithms may determine how well auto tagging worked, and the ROC (Receiver Operator Characteristics) of the autodetection. In various implementation, the algorithms may be run against all objects or be used to auto-tag particular objects. The ROIs may be converted to appropriate data for use in recognition depending on the detection algorithm used (Hessian matrix, histogram, eigenvalues, etc.). SKU numbers may be added if not initially tagged to those items with generic tags. In some implementations, other source data manipulation and analysis may be performed. For example, links between items such as foreground and background may be determined based on whether or not ROIs are totally within other ROIs. In this example, foreground objects in general would either be totally encapsulated by background objects or be taller than background objects. In another example, analytical methods may be applied to evaluate whether or not auto linkages can be made between tagged or auto-tagged items (e.g. a tagged shirt under a tagged head should be linked together). Eventually, other data may be incorporated into each tagged video. For example, a transcript of audio or an identity of music that is played may be included.

In various implementations, various features associated with a keyboard, such as keyboard shortcuts are provided to facilitate the tagging process. The keyboard shortcuts may be user editable. Some default keyboard shortcuts may be: L=link; U=unlink; P=Person/face category; A=Automobiles of any sort category; C=Clothing/shoes/etc. category; E=Electronics category; J=Jewelry category; F=Food; and D=Furniture.

Figure 10:
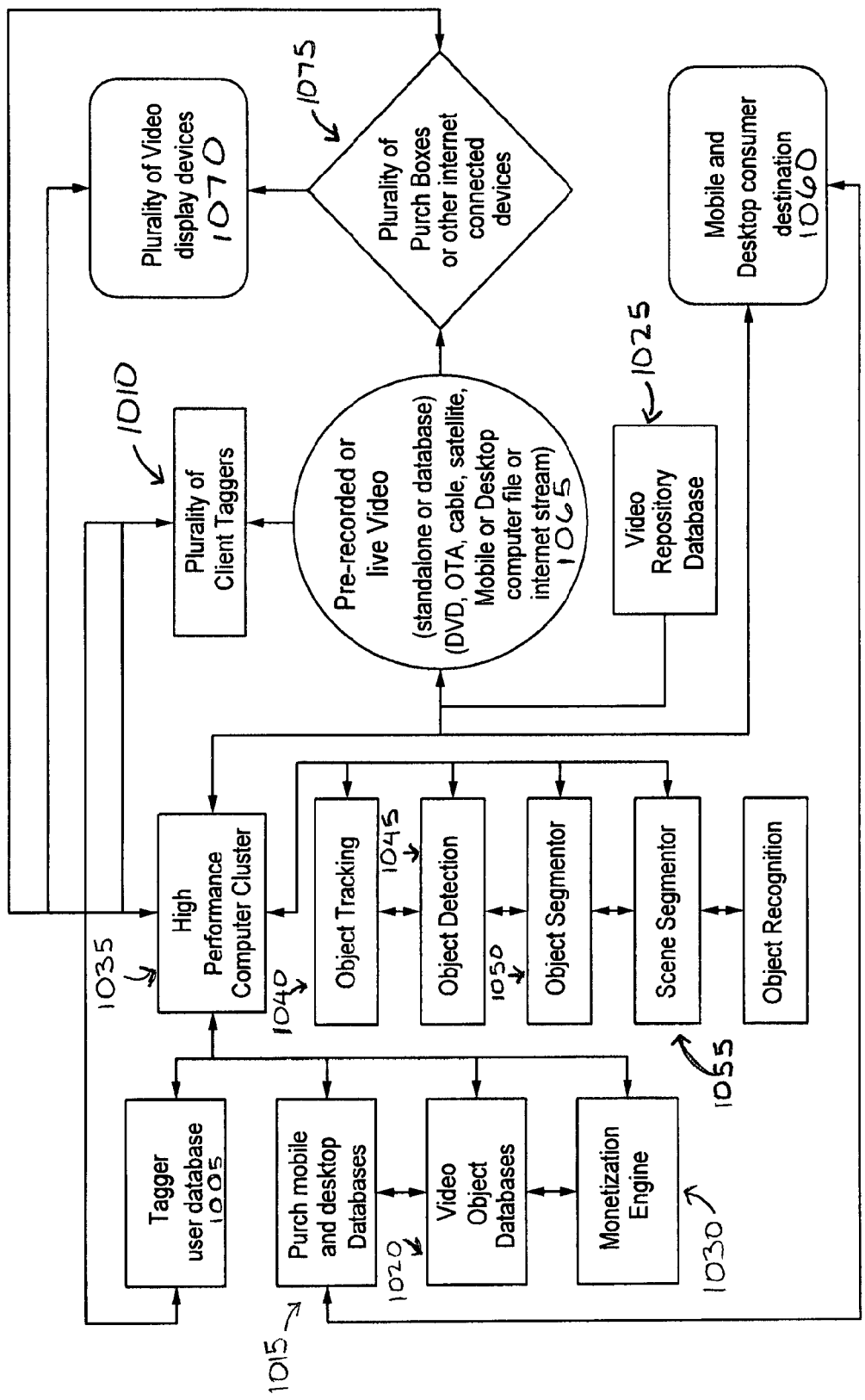
FIG. 10 shows another example of a diagram of one or more components of a system, according to some implementations.
Figure 11:
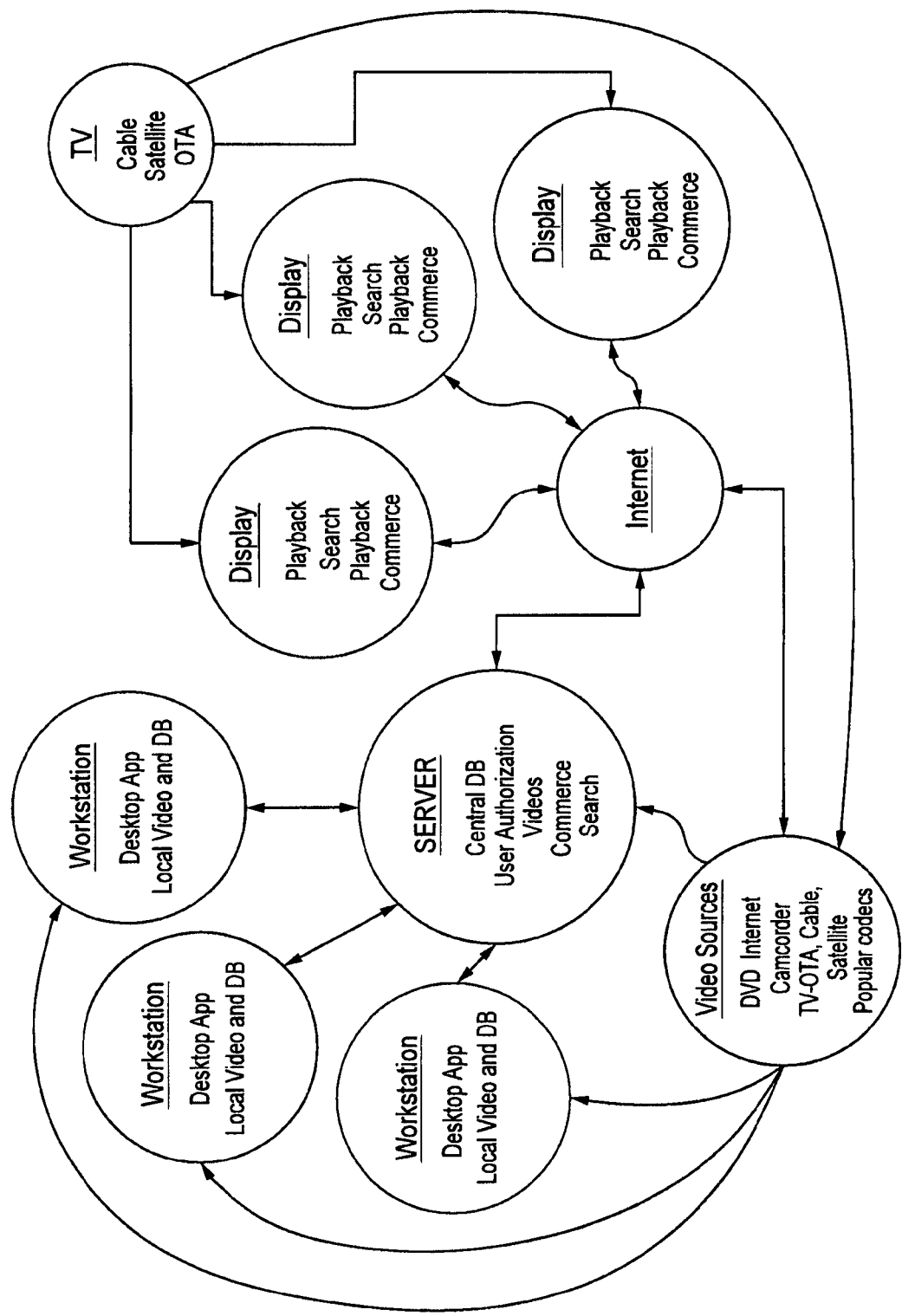
FIG. 11 shows another example of a diagram of one or more components of a system, according to some implementations.

Furthermore, with regards to FIG. 10, additional details and implementations of a tagging system are described. In various implementations, a tagger user database 1005 may be included. The tagger user database may include one or more identifiers that identify authorized users who can access the tagger client application 1010. The database may store a unique tagger identifier, a self chosen username, a user email, a user password, and a user authorization level.

In some implementations, mobile and desktop databases 1015 may be included. The mobile and desktop databases may include a series of interconnected databases that stores consumer users' information. The information may include: a user name; a user id; a password; credit card information; an email address; a real address and phone number; a list of past purchases and date of those purchases; a list of past items clicked upon but not purchased and date; a list of items added to shopping cart but not purchased; a list of users' friends; a list of search queries; a list of favorited items, television shows, characters; and user comments for items, television shows, characters, or other various media.

According to various implementations, a video object database 1020 may be included. The video object database may include a series of databases that stores a list of all the objects tagged in videos. In some implementations, the list may contain: the video name where the object was tagged; the name and other object descriptors; the color(s) of the object; an array of other objects that the current object is linked to (e.g., if the current object is a shirt this may be linked to the face of the actor wearing the shirt); a SKU of the object; frame number(s) or timestamp(s) when the object is visible; the location in each particular frame where the object is visible; and x,y coordinates as well as a size of an associated ROI.

In particular implementations, a video repository database 1025 may be included. The video repository database may include a list of all the videos in the repository. In some implementations, the list may include: a name of a video; a series number; an episode name; an episode number; a year a video was published; a network a video was first displayed on; a type of video (TV, movie, commercial, advertisement, education, etc.); a category of a video (sitcom, drama, action, etc.); a location of the video (e.g. where it is stored on a file server); whether or not the video is currently being tagged (checked by username); whether the video was a live video stream that was auto-tagged; a percent of video tagged (number of frames tagged/total number of frames*100%); a percent of actual product names tagged (% SKU'd=total number of tags with SKU assigned v. total number of tags); and who a video was checked out by, as identified by their username.

In some implementations, a monetization engine 1030 may be included. A monetization engine may be a combination of data mining and secondary databases that link the following metrics to advertisement, products, retailers, or other information to a particular video: a theme of a video; a sentiment of particular scene; an object's visibility in frame; a location of an object in frame; the area the particular objects take up in the frame; a percent of time a particular object is in a scene/video; a linkage of objects to actors, people, or other objects; a popularity of an actor; a perception of a character's role in particular video; a color of an object; a real life valuation of object; a consumer demographic; past purchasing and click behavior; friends' past behavior; a frequency with which an object appears in video or other videos; past browsing, searching, liking, listing history of a particular user on Purch application or website; a past history of the other users who have looked, purchased, liked the same product, actor, actress, or video, etc.

In various implementations, a price/value may be assigned to each object within a video based on the previously described data. Additionally, this data is used as a starting point for keyword bidding advertisers, retailers, and other third party vendors to bid on objects in an auction, such that the highest bidder's ad, product, link, etc. will be displayed when the user clicks on that object while watching a video.

According to various implementations, a high performance computing cluster (HPCC) 1035 may be included. The high performance computing cluster may be an enterprise and/or cloud based CPU/GPU solution that links the various components of the system together. Thus, the high performance computing cluster may provide communications to and from the video repository, and may further provide database server administration, desktop and mobile site administration, ecommerce and advertising solutions. The high performance computing cluster may also be used to run the tagger, object recognition, and other various computer vision software. It will be appreciated that running these features is not limited to the cloud or enterprise high performance computing cluster. These features may be run on a standalone computing device including but not limited to a desktop computer, tablet computer, workstation, Smartphone etc.

In some implementations, an implementation of computer vision may be included. The computer vision may include object tracking 1040, detection, recognition 1045, segmentation 1050, and scene segmentation 1055.

In various implementations, a client tagger may be included. As discussed in greater detail with reference to FIGS. 11-15, the client tagger may be a software program run either on the cloud, enterprise server, HPCC, standalone computing device, or some combination thereof. The client tagger may enable a user to semi-automatically tag one or more objects within a video, frame by frame.

According to various implementations, a mobile and desktop consumer destination 1060 may be included. The mobile and desktop consumer destination may be a website or application that enables users to: log in and sign up with username and password, or through linkages with other social networking sites, including but not limited to Facebook, Twitter, Google+, etc.; and search for objects that they have seen in video. In various implementations, search queries can be generic or specific. For example, queries for a red shirt may be increasingly specific such as "shirt→red shirt→red shirt on Big Bang Theory→red shirt on Big Bang Theory worn by Sheldon". In some implementations, depending on the query, results will display a thumbnail picture of the object or objects found, the name of the video where the object was located, a text description about the object, links to other websites containing information about the object, a list of similar objects the user may be interested in, links to various vendors that sell the object, advertisements based on the particular search terms, user comments about the object, and other videos where similar items have appeared.

In some implementations, the mobile and desktop consumer destination may also allow one or more users to: browse a list of objects tagged in particular videos (for example, a user may pick a particular movie or television show including a particular episode and see all the objects in that video); browse by particular actor or character; browse by video genre, where each item browsed will be represented by a picture, a text description about the object, similar objects the user may be interested in, links to various vendors that sell the object, advertisements based on the particular video being browsed, or based on the particular item selected, user generated comments about the particular item; purchase objects of interest; like or dislike objects, videos, actors or actresses that the user finds on the Purch destination; enter user generated comments about particular items; create lists of objects that are of interest to the user; browse lists of objects created by other users of Purch or members of their social network; share or recommend objects or lists with other users of Purch or with members of their social network; and take a picture of an item one sees in real-life and see if that item or similar items is in any video. In some implementations, the mobile and desktop consumer destination displays a list of video items that were noted, particular actresses or actors linked to one or more items, as well as similar items related to the one or more items. Recommendations or other items that users may find interesting will be determined based on an algorithm found in monetization engine.

According to various implementations, pre-recorded or live video 1065 may be included. The pre-recorded or live video may be provided by a provider of the tagging system, such as Purch, and may enable the tagging of pre-recorded video, including user generated video, DVD, BD, downloadable or streaming video, DVR, pre-recorded television shows, commercial advertisements, and movies. In various implementations, live television may also be tagged on demand. This may be accomplished through a method of growing an ROI around a user clicked object, and comparing that ROI to a database of tagged objects. If no object is found, then the object will be manually tagged. A repository of the tagged source videos may be kept.

In some implementations, a plurality of video display devices 1070 may be included. The plurality of video display devices may be one or more of various types of devices that can display video, including but not limited to: television screens; projectors; computer monitors; tablet devices; and Smartphones. For all displays that are already connected to the internet, various systems and methods disclosed herein enable the user watching a video to click on, tap, or otherwise select an object in a video stream and have the information about that object, including but not limited to the object name, description, and a list of vendors selling the object, to be displayed on the video display device as an overlay on the object, or within a bar adjacent to the video being displayed. Additionally, various advertisements can be overlaid on the video or adjacent to the video. These advertisements are generated by the monetization engine.

In various implementations, Purch Boxes or other Internet connected devices 1075 may be included. The Purch Boxes or other Internet connected devices may be used in conjunction with displays that are not natively connected to the internet, or for those video sources that are played through an internet connected device (e.g., a standard television signal, or standalone DVD, or normal television screen). An Internet connected device, such as a Purch Box, may take a video input, analyze the signal to determine which video is being displayed, and then allow the user to select, click on and otherwise interact with the video on the screen. Alternatively, through the various APIs, software may be installed on third party boxes to interact with the disclosed object database and monetization engine.

Figure 12:
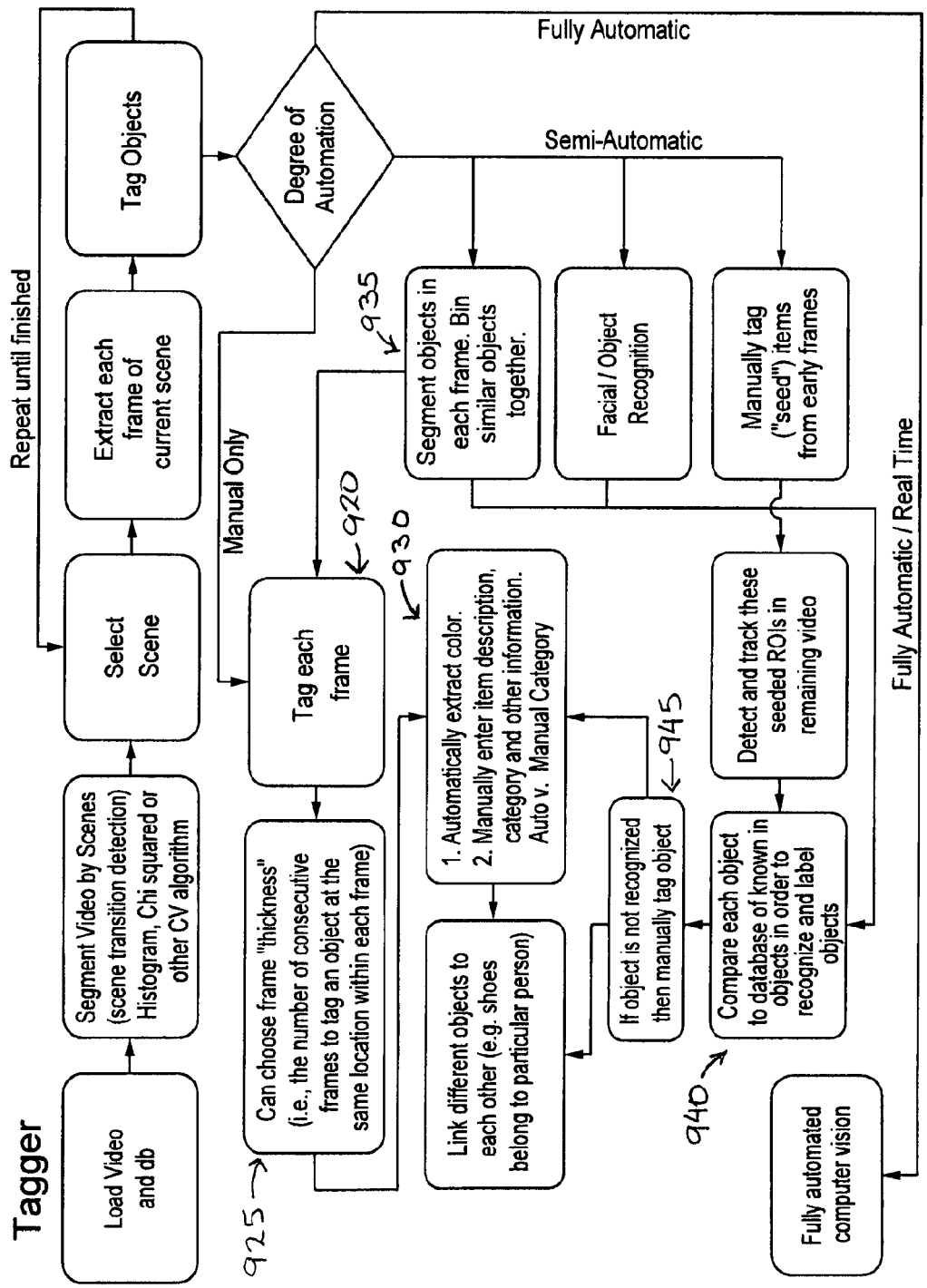
FIG. 12 shows an example of a block diagram of one or more processes, according to some implementations.

FIG. 12 shows another specific implementation of a flow for a tagger module. The flow is similar to the flow shown in FIG. 6 and described above. In this specific implementation, tagging each frame 920 can include a step 925 for choosing frame "thickness." "Thickness" refers to the number of consecutive frames to tag an object at the same location within each frame. A step 930 includes automatically extracting color. A step 935 includes manually entering item description, category, and other information. There can be option to select automatic or manual category input.

Segmenting objects in each frame (step 935) can include comparing 940 each object to a database of known objects in order to recognize and label objects. Objects not recognized can be manually tagged 945.

Furthermore, with regards to FIGS. 13-16, various implementations of a tagger application are described. In various implementations, the tagger application supports various features for a user input device, such as a mouse. For example, a left button may be used to click to select and click and hold to draw an ROI. A different button, such as a right button may be used to: access menu of options; link; unlink; and toggle all ROI on/off. Other buttons, such as a wheel, may be used to scroll forward or backward by the number of frames selected.

Figure 13:
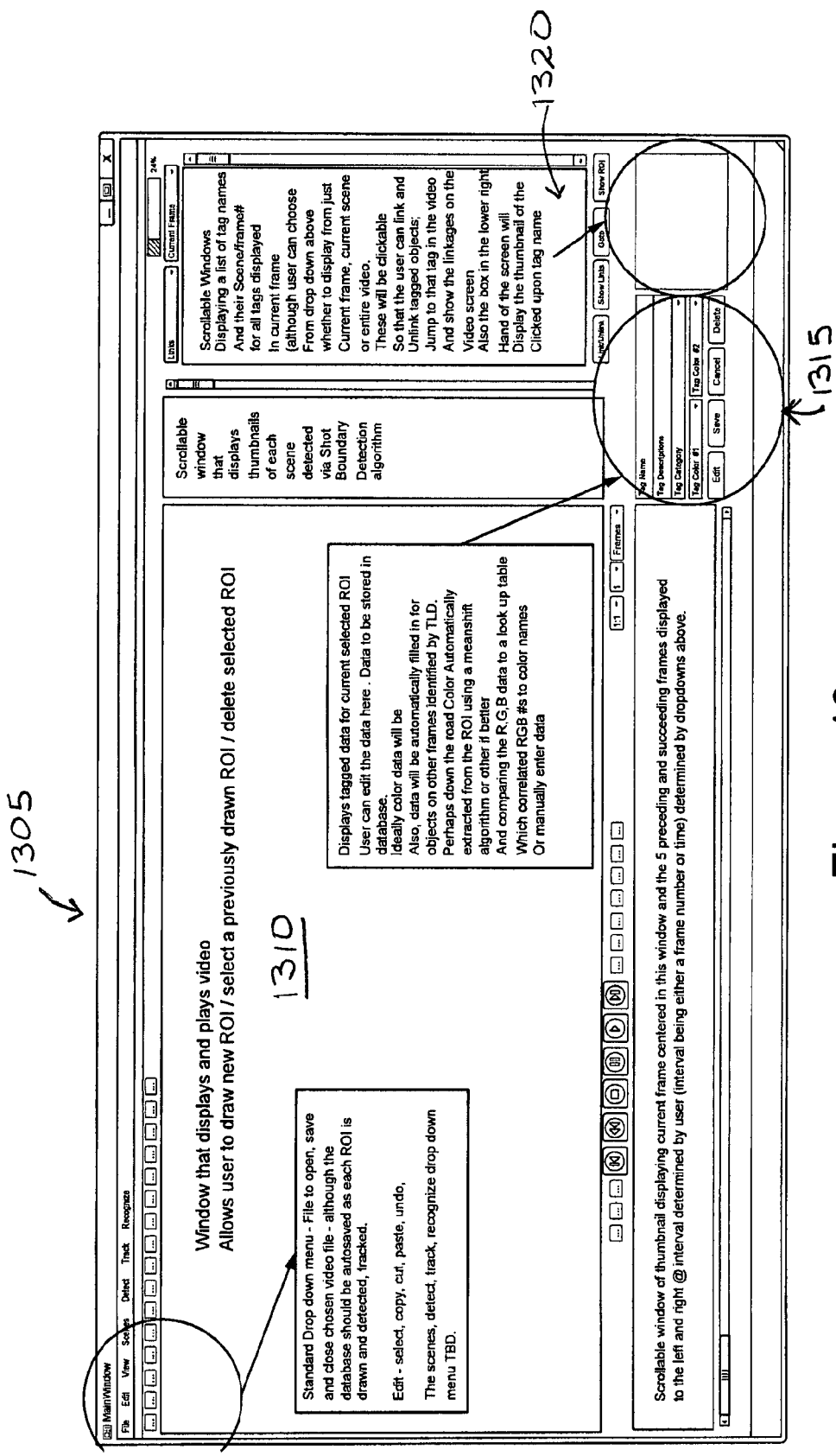
FIG. 13 shows another example of a diagram of one or more components of a system, according to some implementations.

FIG. 13 shows a graphical user interface (GUI) of a main window 1305 of a tagging tool. The interface includes a first window region 1310 that displays and plays video, allows the user to draw a new region of interest, select a previously drawn ROI, and delete a selected ROI. There can be a second window region 1315 that includes controls and options for entering a tag name to be associated with the object in the ROI. There can be a third window region 1320 that includes a scrollable window for displaying a list of tag names and corresponding scene/frame numbers for all tags displayed in the current frame.

Figure 14:
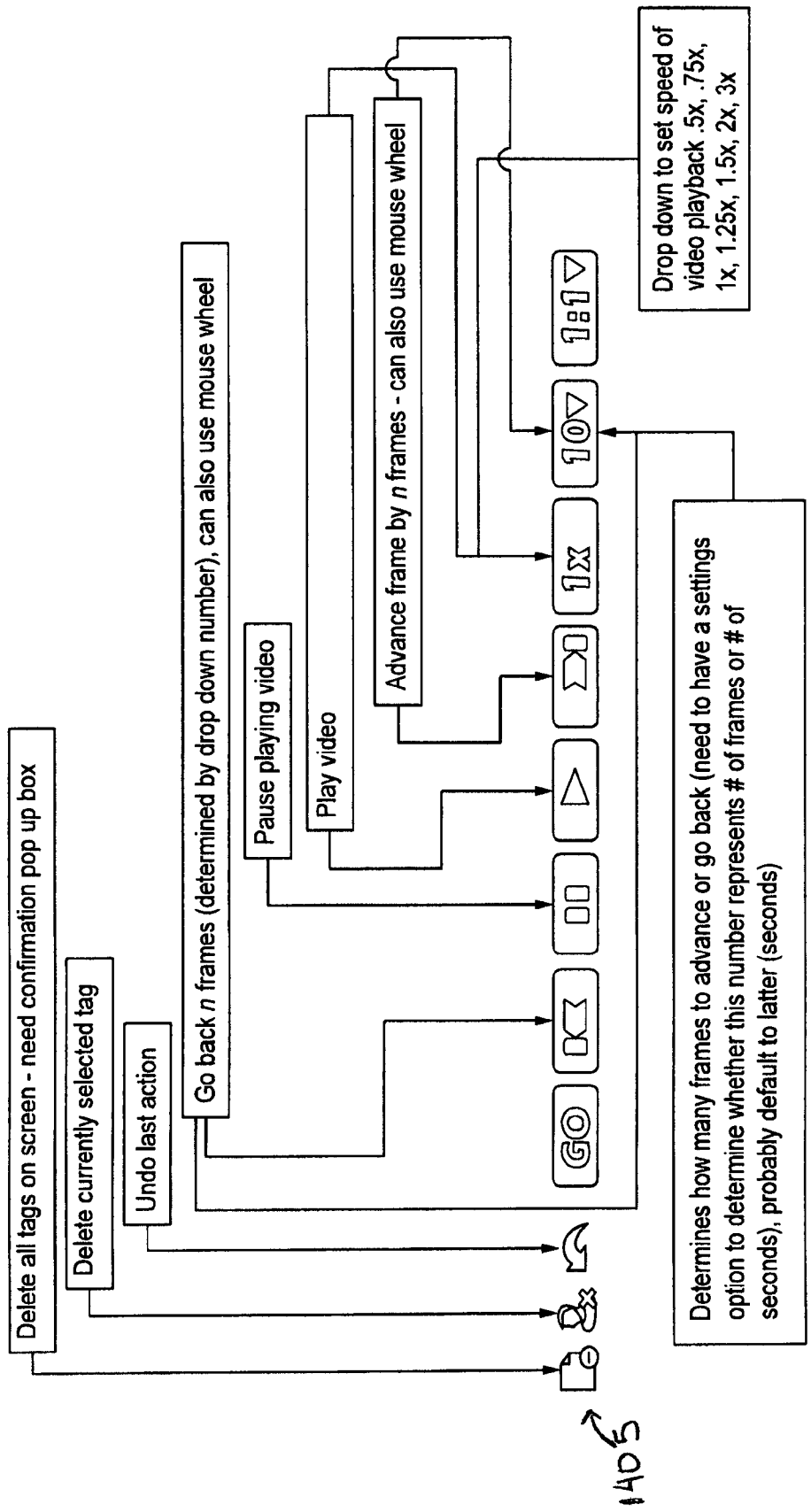
FIG. 14 shows another example of a diagram of one or more components of a system, according to some implementations.
Figure 15:
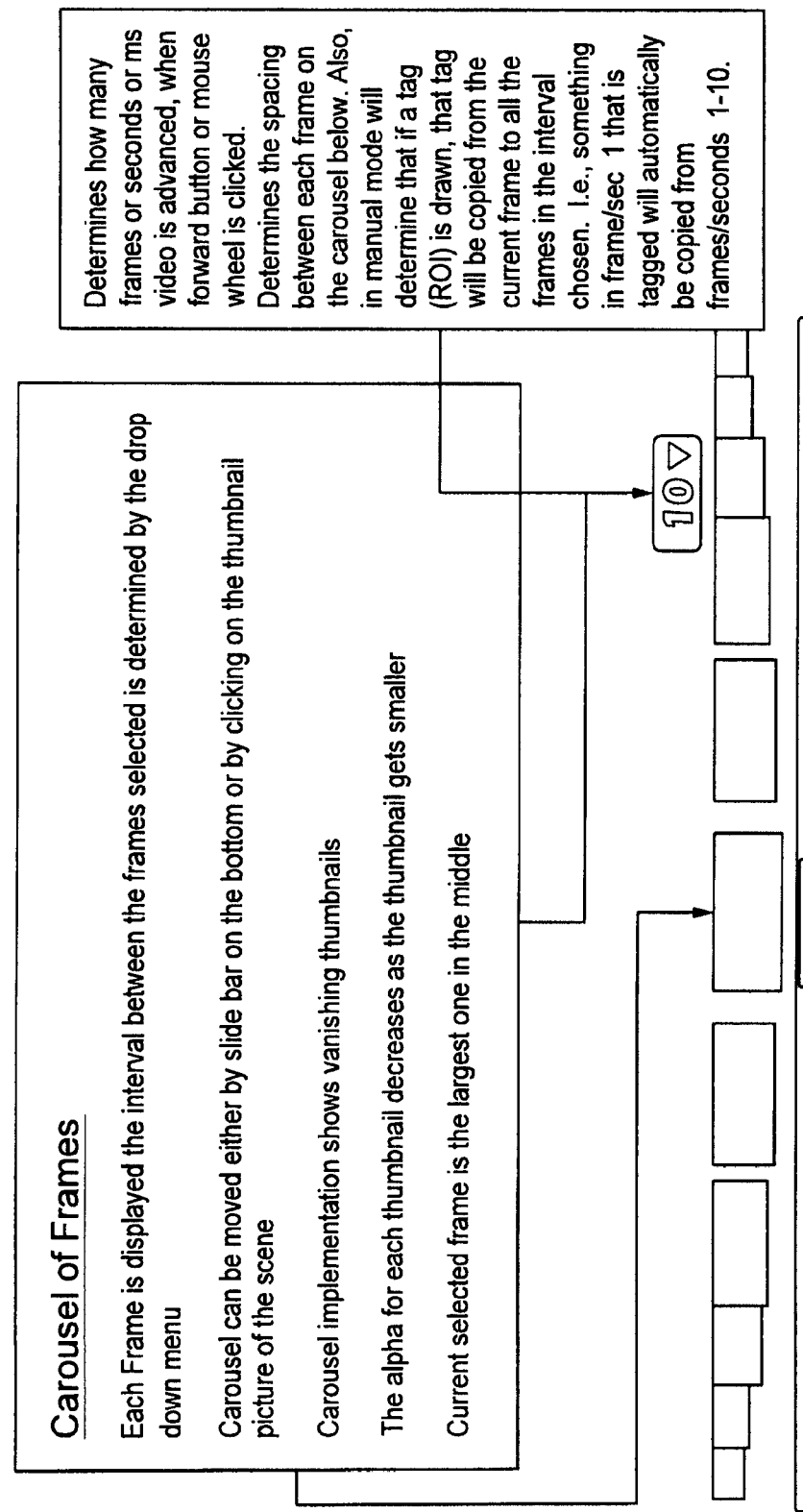
FIG. 15 shows another example of a diagram of one or more components of a system, according to some implementations.
Figure 16:
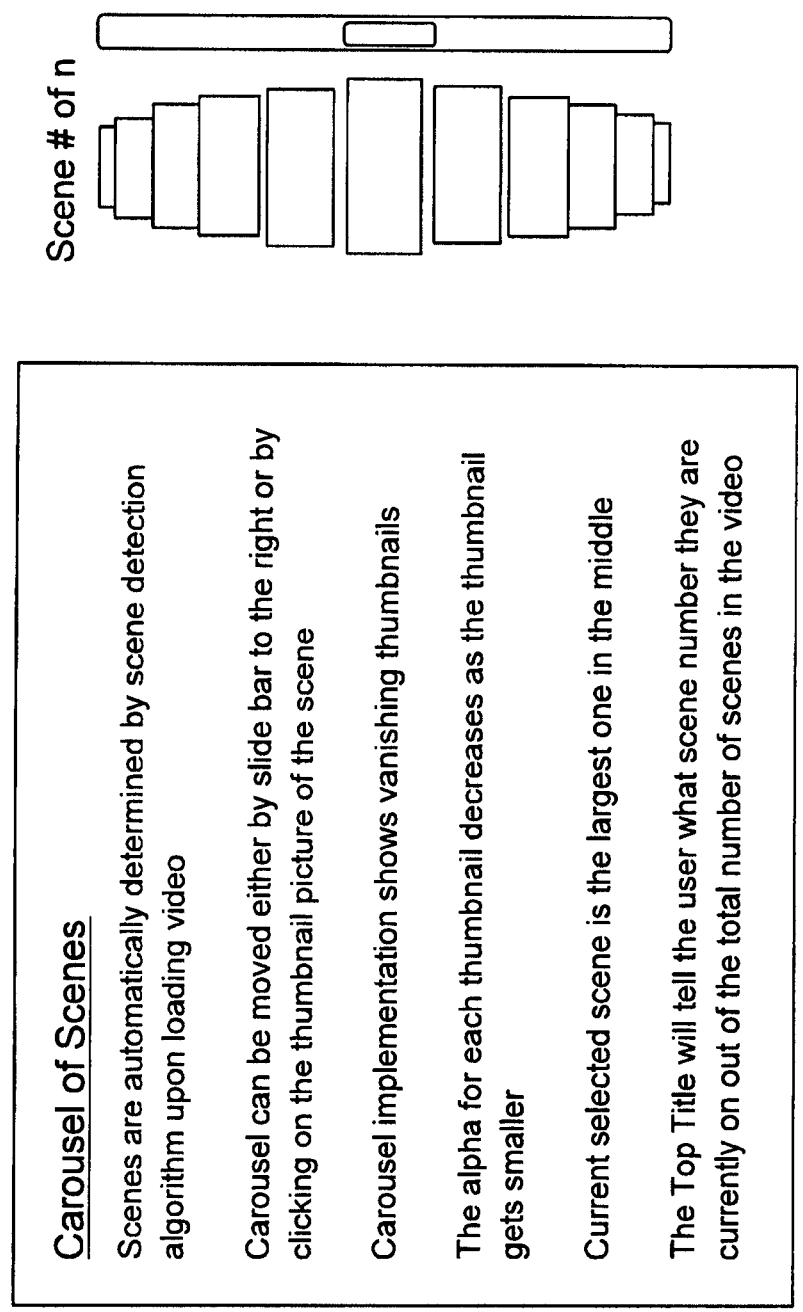
FIG. 16 shows another example of a diagram of one or more components of a system, according to some implementations.

FIG. 14 shows a tool bar 1405 of the tagging tool. The tool bar includes controls for deleting a tag, undoing an action, and playing video. FIG. 15 shows a block diagram of a carousel interface for frames. FIG. 16 shows a block diagram of a carousel interface for scenes.

In various implementations, the tagger may interact with or be communicatively coupled to one or more databases. For example, the tagger may be coupled to the video repository database, as described with reference to FIG. 10. Moreover, the tagger may interact with a database of tags. In some implementations, the database of tags may store: a name of a video; a series number; an episode name; an episode number; a tag name; a tag category; tag links (what other tags is this tagged linked to); tag colors; tag SKU; a time stamp of a tag (or frame number of a tag); a location and size of a tag; and a thumbnail of a tag. In some implementations the tag database does not store a thumbnail because thumbnails may be created dynamically on the fly.

Figure 17:
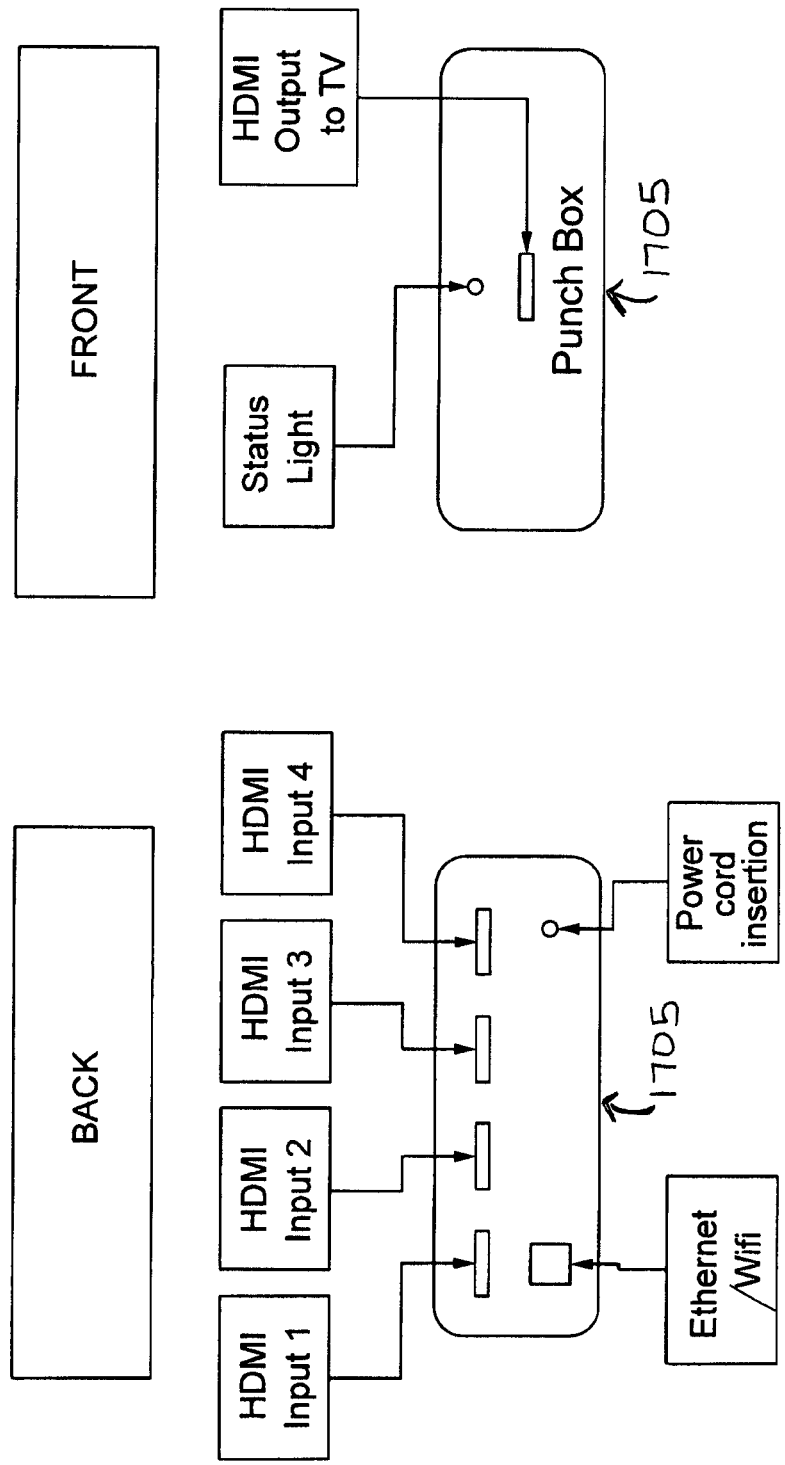
FIG. 17 shows another example of a diagram of one or more components of a system, according to some implementations.
Figure 18:
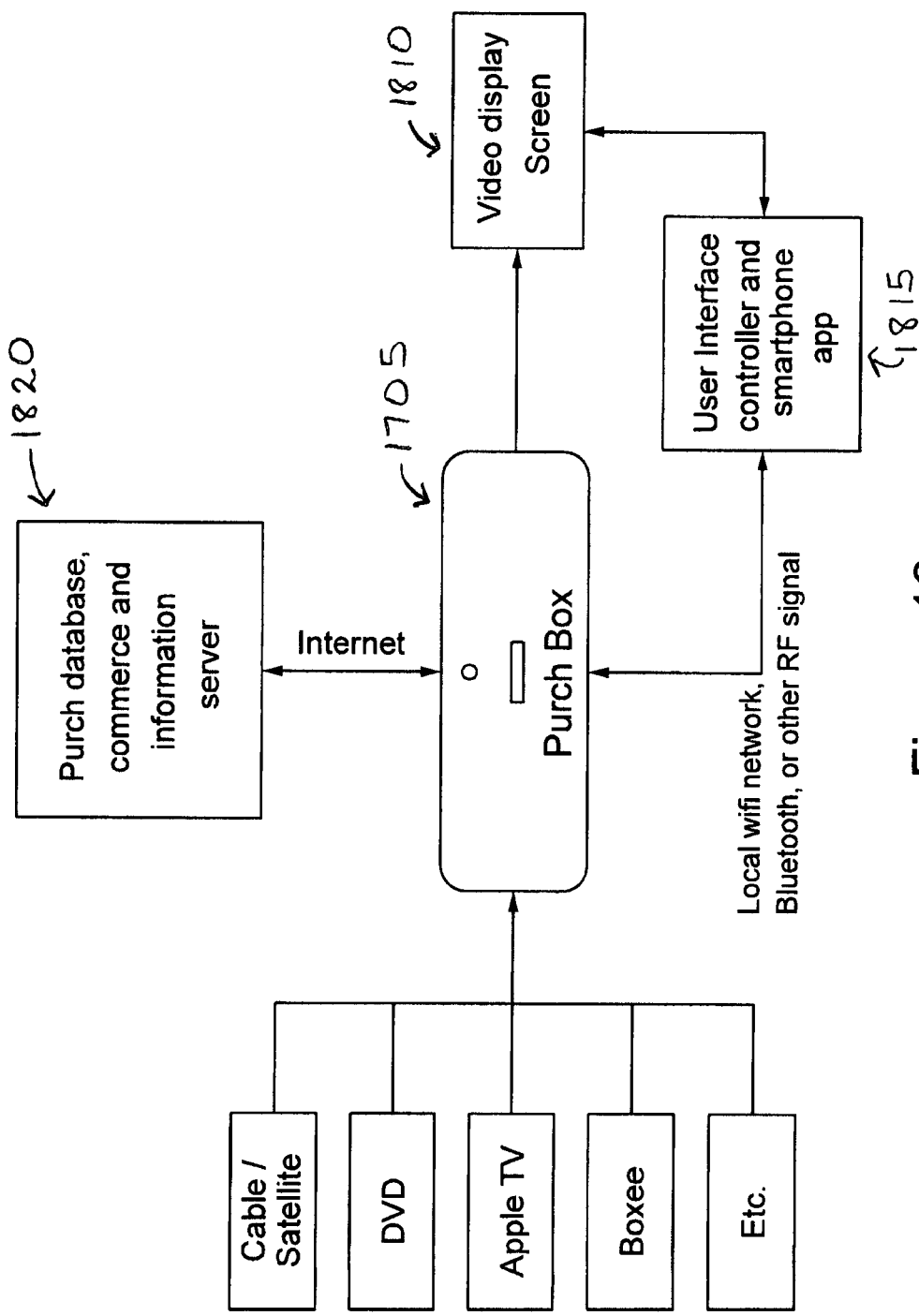
FIG. 18 shows another example of a diagram of one or more components of a system, according to some implementations.

Moreover, with regards to FIGS. 17 and 18, various implementations of a consumer device 1705 are described. In various implementations, a consumer device may include a video display device screen 1810. The video display screen may display a plurality of objects per frame of each video. Each object is tagged and corresponds to an entry in a corresponding database. Objects that are not tagged can be compared to a database of known objects for recognition. In some implementations, a user may select each object through a user interface device 1815. The user interface device may be, for example, a touch, mouse, stylus, body motion, etc.

When the user selects an object, the information about the object stored within the video object database and monetization engine or internet 1820 is displayed either as an overlay on the video or in a separate window or bar adjacent to the video image. This information includes but is not limited to Wikipedia entries, name of the object, color of the object, a link or uniform resource locator (URL) to an ecommerce site or other site where that object may be purchased or other information displayed, a list of similar objects which may be purchased, advertisements related to the object selected, phone number of store where object can be bought, placement of the object in a shopping cart or list of objects one likes or is otherwise interested in, and the ability to share the object (i.e., the name of the video where the object was found, what the object was, etc.) via email, Twitter, Facebook or other social networking sites or technologies.

Additionally, various advertisements can be overlaid either on the video or in separate windows or bars adjacent to the video image based on a proprietary methodology which includes, but is not limited to: a theme of video; a sentiment of particular scene; an object's visibility in frame; a location of an object in a frame; the area the particular objects take up in the frame; a percentage of time a particular object is in a scene/video; linkage of objects to actors, people or other objects; popularity of one or more actors; perception of character's role in particular video; a color of an object; real life valuation of an object; keyword bidding; a consumer demographic; past purchasing and click behavior; friends' past behavior; and a frequency an object appears in a video or other videos.

In a specific implementation, a method of tagging objects in a video includes identifying, at a server, a plurality of objects in the video, linking, at the server, the plurality of objects to online e-commerce sites for immediate purchase, and linking, at the server, the plurality of objects to advertisements based on the nature of the plurality of objects.

The method may include presenting to a user a graphical user interface including a first window region, and a second window region, displaying in the first window region a frame of the video, permitting the user to draw a region of interest within the frame of the video, the region of interest defining a first object in the video to be tagged, and displaying in the second window region an input box for the user to input a tag to be associated with the first object.

The method may include providing the video to a consumer user, the video including a first object that has been linked to at least one of an online e-commerce site that sells the first object or an advertisement based on the nature of the first object, receiving from the consumer user a selection of the first object, and in response to the selection, providing to the consumer user at least one of a link to the online e-commerce site that sells the first object or the advertisement. At least one of the link or advertisement may be overlaid on the video. At least one of the link or advertisement may be in a window adjacent to a window displaying the video.

The method may include storing a listing of the plurality of objects identified in the video, the listing including a plurality of attributes associated with each object, wherein a first attribute associated with an object identifies the object as an article of clothing, and a second attribute associated with the object identifies a person from the video who wore the article of clothing.

The step of identifying, at a server, a plurality of objects in the video may include receiving from a user an identification of a brand to be associated with a first object, storing the first object and information identifying the brand associated with the first object in a database of pre-identified objects, receiving a new video including new objects to be tagged, comparing a first new object with objects stored in the database of pre-identified objects, determining that the first new object is similar to the first object, and automatically associating the first new object with the brand.

In another specific implementation, a system includes one or more servers including one or more processors configured to: receive a video input, analyze the video input, recognize a video associated with the video input, look up the video in a database of tagged videos, and output as an overlay or separate window to a video display device information about an item tagged in the video. The information may be external to the system. The information may be accessible over a network.

The one or more processors may be configured to: display a frame of a recording of a performance involving a plurality of items captured in the recording, receive an identification of a first item of the plurality of items, associate first information to the first item, and track the first item through the recording to associate the same first information to the first item when the first item appears in another frame of the recording.

In a specific implementation, the video includes a recording of a performance and the system includes a second database to store a plurality of attributes associated with the item tagged in the video, wherein a first attribute includes a description of the item, and a second attribute includes a title of the recording.

In another specific implementation, a method includes displaying on an electronic screen of a client device an interactive version of a video, wherein the video includes a recording of a plurality of objects, and at least a subset of the plurality of objects in the interactive version of the video is linked to information external to the video, while the interactive version of the video is playing on the electronic screen, receiving a selection of an object shown in the interactive version of the video, and in response to the selection, displaying on the electronic screen information linked to the selected object.

In a specific implementation, the step of displaying on the electronic screen information linked to the selected object comprises: displaying the information in a first window of the electronic screen while the interactive version of the video is displayed in a second window of the electronic screen.

In another specific implementation, the step of displaying on the electronic screen information linked to the selected object comprises: displaying the information in a first window of the electronic screen while the interactive version of the video is paused in a second window of the electronic screen.

In another specific implementation, the step of displaying on the electronic screen information linked to the selected object comprises: displaying the information in a first window of the electronic screen while the interactive version of the video continues to play in a second window of the electronic screen.

In another specific implementation, the step of displaying on the electronic screen information linked to the selected object comprises: displaying the information and the interactive version of the video in a window of the electronic screen, wherein the information is overlaid over the interactive version of the video. The information may include a link to a website that sells the selected object.

In a specific implementation, the method further includes highlighting in the interactive version of the video each object of the at least a subset of the plurality of objects to indicate that the object is linked to information external to the video.

In another specific implementation, the method further includes providing a user control to toggle between first and second playing modes of the interactive version of the video, wherein in the first playing mode each object of the at least a subset of the plurality of objects are highlighted to indicate that the object is linked to information external to the video, and in the second playing mode each object is not highlighted.

In another specific implementation, a method includes obtaining a recording of a performance involving a plurality of objects, generating an interactive version of the recording by linking objects captured in the recording to information accessible over a network, providing the interactive version of the recording to a client device, receiving from the client device a selection of an object captured in the recording, and providing, over the network, information linked to the object.

The step of generating an interactive version of the recording may include displaying a frame of the recording, the frame including the object involved in the performance and captured in the recording, associating the information to the object, and tracking the object through the recording to associate the same information to the object when the object appears in another frame of the recording. The performance may be recorded by a camera.

Aspects of the system have been described in connection with desktop or web implementations. It should be appreciated, however, that the system is not necessarily limited to desktop implementations. That is, aspects of the system can applied or adapted for use in many different types of computer platforms including mobile, tablets, laptops, phone, smart watches, and so forth.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
receiving, at a server, a first video;
identifying, at the server, a first object of a first plurality of objects in the first video by receiving, at the server from a first computing device operated by a first user, an identification of a brand to be associated with the first object;
storing, by the server, the first object and information identifying the brand associated with the first object in a database of pre-identified objects, wherein each of the pre-identified objects is associated with a set of characteristics, and wherein the set of characteristics includes the brand;
receiving, at the server, a second video including a second plurality of objects;
comparing, at the server, a second object of the second plurality of objects in the video with the pre-defined objects stored in the database;
determining, at the server, whether the second object is similar to the first object;
associating, at the server, the second object to the brand associated with the first object when the second object is determined to be similar to the first object;
linking, at the server, the second object to at least one of an online e-commerce site that sells the brand associated with the second object or an advertisement based on the brand associated with second object;
generating, at the server, a third video based on the second video, the third video including a selectable version of the second object; and
providing, by the server, information for displaying the third video on a display device of a second computing device, wherein an input selection of the selectable version of the second object in the third video at the second computing device causes the server to provide information for causing the second computing device to display on the display device at least one of i) a link to the online e-commerce site that sells the second object, or ii) the advertisement based on the brand associated with the second object.

2. The method of claim 1 further comprising:
providing, by the server, information for displaying a frame of the first video in a first window region of a display device of a third computing device;
receiving, at the server from the third computing device, a user input on the display device of the third computing device outlining a region of interest within the frame of the first video, the region of interest defining a third object in the first video to be tagged; and
providing, by the server, information for displaying an input box in a second window region of the display device of the third computing device, the input box is provided for a second user to input a tag to be associated with the third object.

3. The method of claim 1 further comprising:
receiving, at the server from the second computing device, a selection of the second object by a third user; and
in response to receiving the selection, providing, by the server to the second computing device, information for causing the second computing device to display at least one of i) the link to the online e-commerce site that sells the second object or ii) the advertisement.

4. The method of claim 3 wherein the at least one of the link or advertisement is overlaid on the third video.

5. The method of claim 3 wherein the at least one of the link or advertisement is in a window adjacent to a window displaying the third video.

6. The method of claim 1 further comprising:
storing, at the server, a listing of the plurality of objects identified in the first video, the listing comprising the corresponding set of characteristics linked to each object,
wherein a first characteristic of the set of characteristics linked to an object identifies the object as an article of clothing, and
a second characteristic of the set of characteristics linked to the object identifies a person from the first video wearing the article of clothing.

7. A system comprising:
one or more processors; and
a computer-readable medium including one or more sequences of instructions which, when executed by the one or more processors, causes:
receiving a first video;
identifying a first object of a first plurality of objects in the first video by receiving, at the server from a first computing device operated by a first user, an identification of a brand to be associated with the first object;
storing the first object and information identifying the brand associated with the first object in a database of pre-identified objects, wherein each of the pre-identified objects is associated with a set of characteristics, and wherein the set of characteristics includes the brand;
receiving a second video including a second plurality of objects;
comparing a second object of the second plurality of objects in the video with the pre-defined objects stored in the database;
determining whether the second object is similar to the first object;

associating the second object to the brand associated with the first object when the second object is determined to be similar to the first object;

linking the second object to at least one of an online e-commerce site that sells the brand associated with the second object or an advertisement based on the brand associated with second object;

generating a third video based on the second video, the third video including a selectable version of the second object; and providing information for displaying the third video on a display device of a second computing device, wherein an input selection of the selectable version of the second object in the third video at the second computing device causes the one or more processors to provide information for causing the second computing device to display on the display device at least one of i) a link to the online e-commerce site that sells the second object, or ii) the advertisement based on the brand associated with the second object.

8. The system of claim 7, wherein the one or more sequences of instructions which, when executed by the one or more processors, further causes:

providing information for displaying a frame of the first video in a first window region of a display device of a third computing device;

receiving, from the third computing device, a user input on the display device of the third computing device outlining a region of interest within the frame of the first video, the region of interest defining a third object in the first video to be tagged; and providing information for displaying an input box in a second window region of the display device of the third computing device, the input box is provided for a second user to input a tag to be associated with the third object.

9. The system of claim 7, wherein the one or more sequences of instructions which, when executed by the one or more processors, further causes:

receiving, from the second computing device, a selection of the second object by a third user; and in response to receiving the selection, providing, to the second computing device, information for causing the second computing device to display at least one of i) the link to the online e-commerce site that sells the second object or ii) the advertisement.

10. The system of claim 9, wherein the at least one of the link or advertisement is overlaid on the third video.

11. The system of claim 9, wherein the at least one of the link or advertisement is in a window adjacent to a window displaying the third video.

12. The system of claim 7, wherein the one or more sequences of instructions which, when executed by the one or more processors, further causes:

storing a listing of the plurality of objects identified in the first video, the listing comprising the corresponding set of characteristics linked to each object, wherein a first characteristic of the set of characteristics linked to an object identifies the object as an article of clothing, and a second characteristic of the set of characteristics linked to the object identifies a person from the first video wearing the article of clothing.

13. A non-transitory computer-readable medium including one or more sequences of instructions which, when executed by one or more processors, causes:

receiving, at a server, a first video;

identifying, at the server, a first object of a first plurality of objects in the first video by receiving, at the server from a first computing device operated by a first user, an identification of a brand to be associated with the first object;

storing, by the server, the first object and information identifying the brand associated with the first object in a database of pre-identified objects, wherein each of the pre-identified objects is associated with a set of characteristics, and wherein the set of characteristics includes the brand;

receiving, at the server, a second video including a second plurality of objects;

comparing, at the server, a second object of the second plurality of objects in the video with the pre-defined objects stored in the database;

determining, at the server, whether the second object is similar to the first object;

associating, at the server, the second object to the brand associated with the first object when the second object is determined to be similar to the first object;

linking, at the server, the second object to at least one of an online e-commerce site that sells the brand associated with the second object or an advertisement based on the brand associated with second object;

generating, at the server, a third video based on the second video, the third video including a selectable version of the second object; and providing, by the server, information for displaying the third video on a display device of a second computing device, wherein an input selection of the selectable version of the second object in the third video at the second computing device causes the server to provide information for causing the second computing device to display on the display device at least one of i) a link to the online e-commerce site that sells the second object, or ii) the advertisement based on the brand associated with the second object.

14. The non-transitory computer-readable medium of claim 13 further including one or more sequences of instructions which, when executed by one or more processors, causes:

providing, by the server, information for displaying a frame of the first video in a first window region of a display device of a third computing device;

receiving, at the server from the third computing device, a user input on the display device of the third computing device outlining a region of interest within the frame of the first video, the region of interest defining a third object in the first video to be tagged; and providing, by the server, information for displaying an input box in a second window region of the display device of the third computing device, the input box is provided for a second user to input a tag to be associated with the third object.

15. The non-transitory computer-readable medium of claim 13 further including one or more sequences of instructions which, when executed by one or more processors, causes:

receiving, at the server from the second computing device, a selection of the second object by a third user; and in response to receiving the selection, providing, by the server to the second computing device, information for causing the second computing device to display at least one of i) the link to the online e-commerce site that sells the second object or ii) the advertisement.

16. The non-transitory computer-readable medium of claim 15 wherein at least one of the link or advertisement is overlaid on the third video.

17. The non-transitory computer-readable medium of claim 15 wherein the at least one of the link or advertisement is in a window adjacent to a window displaying the third video.

18. The non-transitory computer-readable medium of claim 13 further including one or more sequences of instructions which, when executed by one or more processors, causes:
- storing, at the server, a listing of the plurality of objects identified in the first video, the listing comprising the corresponding set of characteristics linked to each object,
- wherein a first characteristic of the set of characteristics linked to an object identifies the object as an article of clothing, and
- a second characteristic of the set of characteristics linked to the object identifies a person from the first video wearing the article of clothing.

\* \* \* \* \*